US012626543B1

(12) United States Patent
Mahida et al.

(10) Patent No.: US 12,626,543 B1
(45) Date of Patent: May 12, 2026

(54) SYSTEM AND METHOD FOR VEHICLE DIAGNOSTICS WITH SYNCHRONIZED VEHICLE ACOUSTIC AND VIBRATION DATA WITH ON-BOARD DIAGNOSTIC DATA

(71) Applicant: Innova Electronics Corporation, Irvine, CA (US)

(72) Inventors: Kaushik Mahida, Irvine, CA (US); Derk Steven Louwerse, Dublin (IE); Bruce B. Brunda, Newport Beach, CA (US)

(73) Assignee: Innova Electronics Corporation, Irvine, CA (US)

( * ) Notice: Subject to any disclaimer, the term of this patent is extended or adjusted under 35 U.S.C. 154(b) by 0 days.

(21) Appl. No.: 19/320,376

(22) Filed: Sep. 5, 2025

Related U.S. Application Data

(63) Continuation-in-part of application No. 19/179,398, filed on Apr. 15, 2025, now Pat. No. 12,412,432.

(51) Int. Cl.
G07C 5/00 (2006.01)
G07C 5/08 (2006.01)
(Continued)

(52) U.S. Cl.
CPC ........... G07C 5/008 (2013.01); G07C 5/0808 (2013.01); H04W 4/025 (2013.01); H04W 4/80 (2018.02)

(58) Field of Classification Search
None
See application file for complete search history.

(56) References Cited

U.S. PATENT DOCUMENTS 9,646,432 B2 5/2017 Madison
9,761,062 B2 9/2017 Chen
(Continued)

FOREIGN PATENT DOCUMENTS

CN 115718862 A * 2/2023
CN 118072416 A * 5/2024 .......... G01M 17/007
DE 102019117817 A1 1/2021

OTHER PUBLICATIONS

Engine Fault Diagnosis using DTW, MFCC and FFT; pp. 96-107 (Year: 2009).*

(Continued)

*Primary Examiner* — Abdhesh K Jha
(74) *Attorney, Agent, or Firm* — Stetina Garred Brucker & Newboles

(57) ABSTRACT

A diagnostic system for assessing engine wear utilizes data from sensors in a vehicle engine compartment and electronic data from a vehicle communications network to provide a comprehensive diagnostic evaluation. The system includes a sensor device with an audio sensor for capturing engine sound, an accelerometer for detecting vibration, and a near-field communication (NFC) tag for sensor information. The sensor device communicates sound and vibration data to a remote server, while a data acquisition and transfer (DAT) device connected to the vehicle's diagnostic port transmits engine performance metrics. A Dynamic Time Warping (DTW) algorithm aligns time-series data from the sensor and vehicle metrics to identify engine problems. The system supports cloud-based diagnostics and enables optimal sensor placement using geo-location or positional data. Applications include smartphone integration, Wi-Fi 6 communication for high-speed data transfer, and scan modes for varying diagnostic detail levels.

21 Claims, 7 Drawing Sheets

(51) Int. Cl.
*H04W 4/02* (2018.01)
*H04W 4/80* (2018.01)

(56) References Cited

U.S. PATENT DOCUMENTS

| | | | |
|---|---|---|---|
| 9,824,511 B2 | 11/2017 | Valeri | |
| 10,253,716 B2 | 4/2019 | Mentele | |
| 10,818,107 B2 | 10/2020 | Mentele | |
| 10,844,786 B2 | 11/2020 | Lebendt | |
| 11,462,058 B2 | 10/2022 | Zhang | |
| 11,482,059 B2 | 10/2022 | Claessens | |
| 11,521,435 B2 | 12/2022 | Jung | |
| 12,046,254 B2 | 7/2024 | Pokora | |
| 12,165,440 B1 | 12/2024 | Pham | |
| 2013/0304278 A1* | 11/2013 | Chen | G06F 17/00 |
| | | | 701/2 |

| | | |
|---|---|---|
| 2014/0074345 A1 | 3/2014 | Gabay |
| 2017/0053460 A1 | 2/2017 | Hauser |
| 2021/0049480 A1 | 2/2021 | Kale |
| 2023/0256979 A1 | 8/2023 | Nesbitt |
| 2024/0194000 A1 | 6/2024 | Conklin |

OTHER PUBLICATIONS

Ferit Akbalik, et al.; "Engine Fault Detection by Sound Analysis and Machine Learning;" Applied Sciences; 14 6532; Jul. 26, 2024; 18 pages.

Guangbin Wang et al; "Bearing fault feature selection method based on dynamic time warped related searched;" Journal of Vibroengineering; vol. 25 Issue 2; Mar. 2003; 14 pages.

* cited by examiner

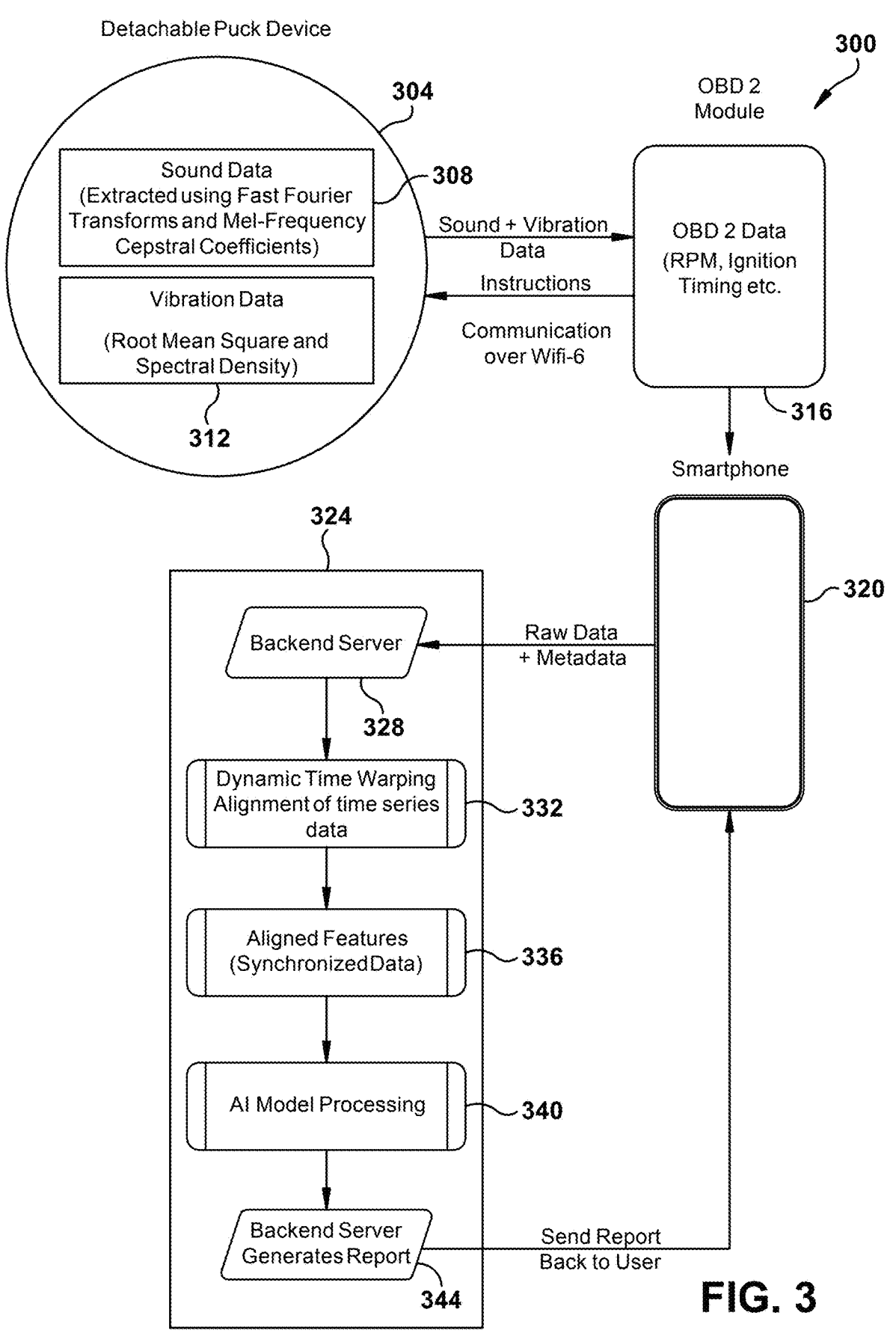

Detachable Puck Device

304

Sound Data
(Extracted using Fast Fourier Transforms and Mel-Frequency Cepstral Coefficients)
308

Vibration Data
(Root Mean Square and Spectral Density)

312

300

OBD 2 Module

OBD 2 Data
(RPM, Ignition Timing etc.

Sound + Vibration Data

Instructions

Communication over Wifi-6

316

Smartphone

320

324

Backend Server

328

Dynamic Time Warping Alignment of time series data
332

Aligned Features (Synchronized Data)
336

AI Model Processing
340

Backend Server Generates Report
344

Raw Data + Metadata

Send Report Back to User

FIG. 3

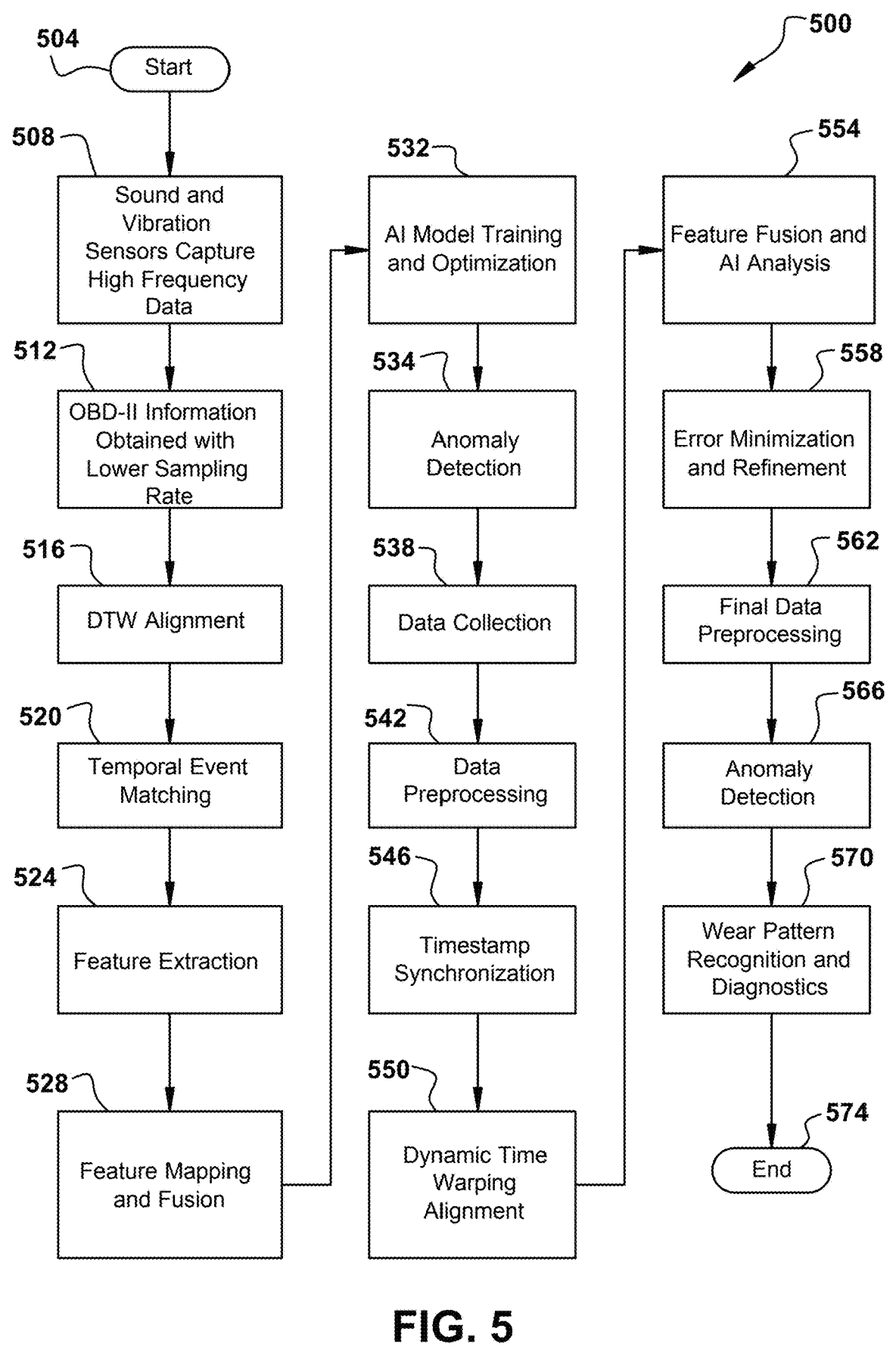

504 Start

500

508 Sound and Vibration Sensors Capture High Frequency Data

512 OBD-II Information Obtained with Lower Sampling Rate

516 DTW Alignment

520 Temporal Event Matching

524 Feature Extraction

528 Feature Mapping and Fusion

532 AI Model Training and Optimization

534 Anomaly Detection

538 Data Collection

542 Data Preprocessing

546 Timestamp Synchronization

550 Dynamic Time Warping Alignment

554 Feature Fusion and AI Analysis

558 Error Minimization and Refinement

562 Final Data Preprocessing

566 Anomaly Detection

570 Wear Pattern Recognition and Diagnostics

574 End

FIG. 5

SYSTEM AND METHOD FOR VEHICLE DIAGNOSTICS WITH SYNCHRONIZED VEHICLE ACOUSTIC AND VIBRATION DATA WITH ON-BOARD DIAGNOSTIC DATA

CROSS-REFERENCE TO RELATED APPLICATIONS

This application is a Continuation-in-Part to co-pending U.S. patent application Ser. No. 19/179,398, filed on Apr. 15, 2025, the contents of which are incorporated herein by reference.

STATEMENT RE: FEDERALLY SPONSORED RESEARCH/DEVELOPMENT

Not Applicable

BACKGROUND

1. Technical Field

The present disclosure relates generally to automotive diagnostics and vehicle health monitoring, encompassing systems designed to evaluate engine performance and identify mechanical issues. More specifically, it pertains to AI-driven diagnostic solutions that synchronize and analyze time-series data from multiple sensor sources, including OBD-II modules and high-frequency sound and vibration sensors placed within an engine bay. Through the integration of dynamic time warping (DTW) and machine learning algorithms, the system provides enhanced detection of wear patterns and early-stage mechanical anomalies, improving the accuracy and effectiveness of predictive maintenance in automotive applications.

2. Description of the Related Art

On-board diagnostic (OBD) systems emerged in the late 1960s and early 1970s as automotive manufacturers began experimenting with methods to monitor and regulate vehicle performance, particularly in response to growing environmental and safety concerns. Early prototypes were rudimentary, often proprietary, and intended primarily for internal use by manufacturers to verify compliance with evolving emissions standards. By the 1980s, regulatory bodies such as the California Air Resources Board (CARB) began pushing for more standardized methods of emissions monitoring, leading to the development of OBD-I systems. OBD-I introduced more consistent diagnostic capabilities but lacked uniform data protocols, making it difficult for independent mechanics and consumers to interpret fault codes or implement standardized repair procedures.

A push for universal compatibility and more rigorous emissions oversight led to the introduction of OBD-II in the mid-1990s. Mandated for all new vehicles sold in the United States from 1996 onward, OBD-II provided a standardized hardware interface and a set of standardized diagnostic trouble codes (DTCs). This made it possible for any generic OBD-II scanner to read fault codes and observe real-time engine parameters such as RPM, fuel trim, and sensor readings from components like oxygen sensors or the mass airflow sensor. Over time, OBD-II systems evolved to include additional protocols, improved data rates, and enhanced monitoring for increasingly sophisticated engine control units (ECUs). With the advent of more powerful onboard computers, the scope of OBD-II diagnostics expanded, yet it remained largely focused on emissions-related and electronic subsystems. While invaluable for detecting issues like misfires, sensor failures, and catalytic converter effectiveness, traditional OBD-II systems are not designed to address mechanical wear problems, such as belt degradation, bearing faults, or other early-stage physical deteriorations.

OBD is reactive rather than predictive. It typically registers faults when sensors detect out-of-spec conditions. Automated vehicle diagnostics based solely on OBD data can miss several potentially dangerous conditions because OBD primarily detects electronic sensor faults and emissions-related issues, rather than mechanical problems that may present as abnormal sounds, vibrations, or physical wear and tear. Some critical vehicle conditions that could go undetected include mechanical failures that don't trigger OBD fault codes. A loose or worn timing belt or chain can lead to catastrophic engine failure, but it may not generate a fault code until the engine misfires or stops running. Similarly, a failing accessory belt or pulley, such as a slipping serpentine belt or worn idler pulley, can cause the alternator or water pump to stop functioning, but unless a related sensor detects a voltage drop or overheating, no OBD warning may be issued.

Structural and drive-train issues can also be overlooked. A cracked or weakened motor mount can cause excessive engine movement, leading to driveline misalignment, but unless this causes a sensor to detect abnormal vibrations, it won't be flagged. A failing wheel bearing often produces a humming or grinding noise that could indicate imminent failure and wheel detachment, yet it will not trigger an OBD warning unless the failure affects the ABS sensor. Similarly, driveshaft or CV joint damage can cause vibrations and loss of control, but unless the electronic stability control system detects an anomaly, the driver may receive no warning.

Suspension and braking system failures present additional risks. A leaking or failing shock absorber or strut can severely impact handling and braking distance, but OBD does not monitor suspension components unless the vehicle has an adaptive suspension system with sensors. A failing brake rotor or pad may cause vibrations or pulsations when braking, yet OBD may only register an issue if a brake sensor detects excessive wear or if the ABS system identifies a failure.

Issues related to fuel delivery and ignition may also go undetected. A failing fuel pump can cause intermittent power loss, but unless fuel pressure drops below a sensor's threshold, it may not trigger a fault code. Similarly, a failing ignition coil or spark plug may cause subtle misfires.

BRIEF SUMMARY

In one embodiment, the disclosure includes a diagnostic system for assessing engine wear that comprises a sensor device and a data acquisition and transfer device. The sensor device includes an audio sensor to capture engine sound, an accelerometer to capture vibration data, and a near-field communication tag carrying device information. The sensor device is operable to send identification and placement information to a remote device to assist in achieving optimal positioning within the engine compartment and to transmit captured sound and vibration data to a remote server. The data acquisition and transfer device connects to the vehicle's diagnostic port to receive event-driven or asynchronous engine performance metrics and forwards those metrics to the remote server. Prior to diagnosing engine problems, a Dynamic Time Warping algorithm aligns the time-series sound and vibration data with the engine performance metrics. In various implementations, the remote device is a smartphone; device information includes geo-location or positional data relative to a secondary sensor or compartment reference; the sensor device incorporates a Wi-Fi 6 transceiver for robust high-speed communication; and the engine performance metrics are collected under Quick, Standard, or Deep scan modes.

In another embodiment, the disclosure includes a diagnostic system similar to the foregoing but with a more general sensor device that outputs vehicle operation data. This sensor device likewise carries an NFC tag for placement identification, communicates operation data to a remote server, and works with a diagnostic-port interface to collect event-driven engine metrics. A Dynamic Time Warping algorithm aligns the operation data and the engine metrics before diagnosis. Embodiments may employ a smartphone as the remote device; capture geo-location or positional information relative to a secondary sensor or defined compartment landmark; use a Wi-Fi 6 wireless transceiver; and support Quick, Standard, and Deep diagnostic scan modes.

In a further embodiment, the disclosure includes a diagnostic system that applies artificial-intelligence-based analytics to detect engine wear patterns. The system comprises a sensor device for vehicle operation data, an NFC tag for device information, and a diagnostic-port interface for engine performance metrics. A Hidden Markov Model analyzes temporal sequences formed by the vehicle operation data and the engine metrics to identify progressive wear conditions.

In a still further embodiment, the disclosure includes a method for assessing engine wear that comprises receiving vehicle operation data from a puck-style sensor in the engine compartment, receiving engine performance metrics from the on-board diagnostics system, and processing both data streams through a Hidden Markov Model running on a diagnostic device to identify wear patterns. The diagnostic device may be a remote server or a handheld device. The method can include training the Hidden Markov Model with baseline reference data, generating state sequences for typical and atypical operation to classify incoming sound and vibration signals, and applying a Dynamic Time Warping algorithm to align and standardize asynchronous or irregular time-series data before HMM analysis.

In yet another embodiment, the disclosure includes a diagnostic-server system with a communication circuit that receives a vehicle identification number, sensor placement data, time-series operation data, and event-driven engine metrics. A memory stores engine-compartment layout images and optimized sensor placement positions. A processor conveys the layout and placement guidance to a user device and applies Dynamic Time Warping to align the received data streams for wear-condition identification. In some implementations, the processor generates augmented-reality or virtual-reality overlays of the compartment layout with interactive visual cues for optimized sensor placement. The system can also receive thermal, acoustic, or vibration maps from additional sensors and overlay these diagnostic measurements onto compartment images or CAD-derived models to assist in sensor placement and wear diagnosis.

These and other features will be more clearly understood from the following detailed description and the accompanying drawings.

BRIEF DESCRIPTION OF THE DRAWINGS

These and other features and advantages of the various embodiments disclosed herein will be better understood with respect to the following description and drawings, in which:

FIG. 3 is a flow diagram of an example embodiment of a system for vehicle diagnostics with synchronized vehicle acoustics and on-board diagnostic sensor data;

FIG. 5 is flowchart of an example embodiment of a system for vehicle diagnostics with synchronized vehicle acoustic and vibration data with on-board diagnostic data;

Common reference numerals are used throughout the drawings and the detailed description to indicate the same elements.

DETAILED DESCRIPTION

Figure 1:
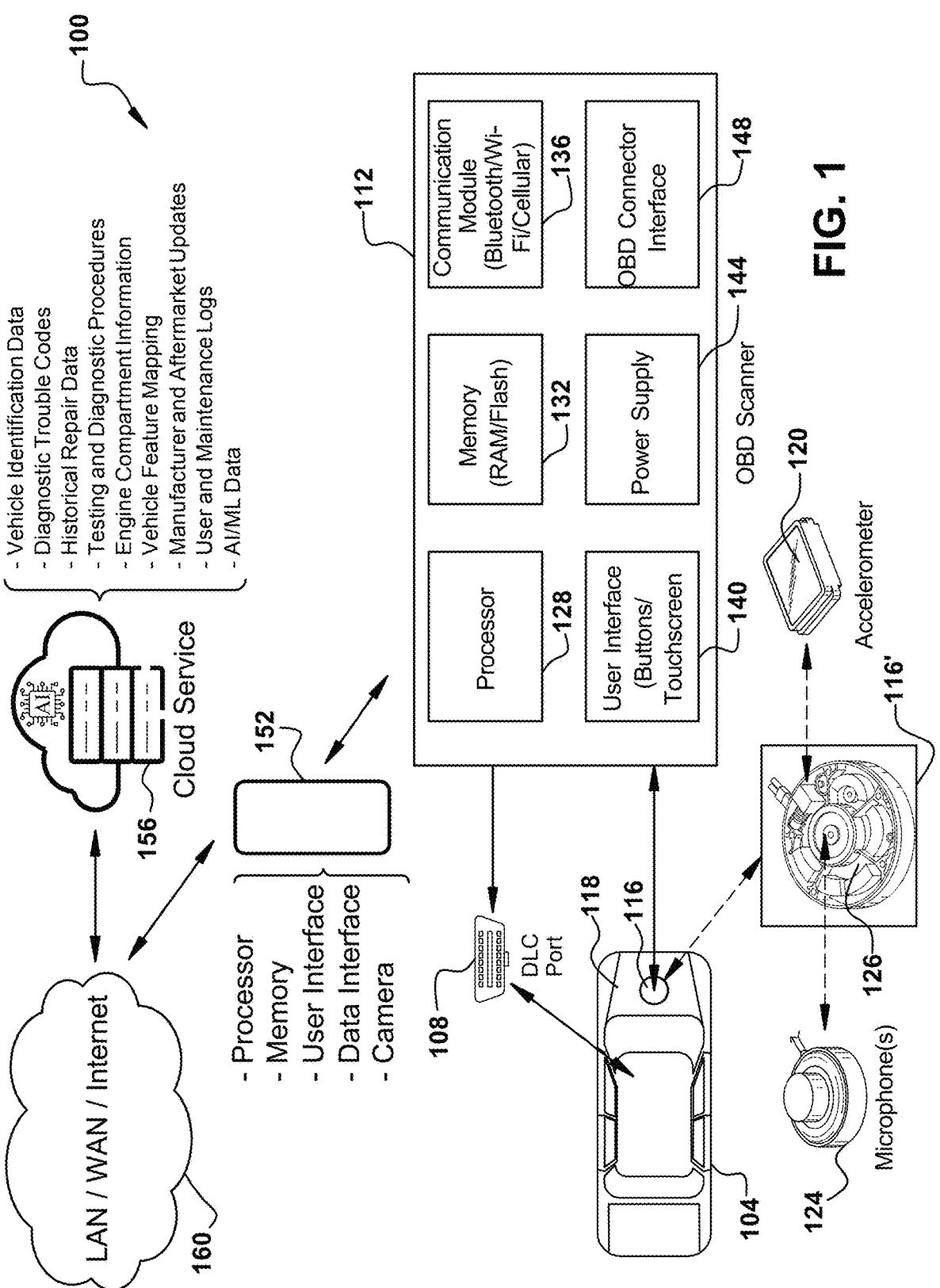
FIG. 1 is diagram of an example embodiment of a system for vehicle diagnostics with synchronized vehicle acoustic and vibration data with on-board diagnostic data.

The detailed description set forth below in connection with the appended drawings is intended as a description of certain embodiments of a vehicle diagnostic system and related method, and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Example embodiments herein teach an advanced AI-powered engine diagnostic system that integrates data from OBD-II sensors with high-frequency sound and vibration analysis to provide a comprehensive assessment of engine health. Unlike traditional diagnostic methods that rely solely on OBD-II readings, which only capture electronic engine parameters, this system incorporates a detachable puck sensor device that is placed within the engine bay. The puck device includes a sound sensor that captures or records sound and vibration signals. An audio sensor suitably includes one or more of a microphone, piezo sensor, ultrasonic pickup, MEMS sound detectors, or vibration-based audio pickup. An OBD-II module connected to the vehicle's diagnostic port collects critical performance metrics such as RPM, fuel-air mixture, and timing. In further example embodiments, additional transducers includes one or more additional sensors, such as an accelerometer, a temperature sensor, a Hall effect sensor, or other suitable sensor. These are suitably disposed separately or within the puck. The two devices communicate wirelessly and transmit synchronized data in selectable scan modes, including Quick Scan, Normal Scan, and Deep Scan, ensuring flexibility in diagnostic depth.

Temperature readings from sensors in the puck can also be analyzed using DTW, particularly when monitoring the heating and cooling cycles of specific engine components. Since temperature changes occur gradually, DTW can align trends in temperature fluctuations to detect abnormalities, such as excessive heat buildup in a bearing or an engine component operating outside its normal thermal range. Comparing temperature curves from multiple pucks placed in different engine locations can further enhance diagnostic precision.

Magnetometer and Hall effect sensor data from pucks can also be used with DTW to analyze rotational speed variations in belts, pulleys, or shafts. If a puck sensor detects irregularities in the rotational motion of a component, DTW can align this data with previous normal patterns to highlight developing inconsistencies, such as belt slip or pulley misalignment.

A feature of this system is its ability to securely transfer data wirelessly, suitably utilizing Wi-Fi 6 technology to maintain reliable transmission even in metal-rich environments, where signal interference can otherwise be a problem. Wi-Fi 6 (802.11ax) is a late generation of wireless networking technology that improves speed, efficiency, and capacity for modern high-demand environments. It operates on both 2.4 GHz and 5 GHz bands (with Wi-Fi 6E adding 6 GHz support) and introduces higher data rates, lower latency, and better performance in congested areas through technologies like OFDMA (Orthogonal Frequency Division Multiple Access), MU-MIMO (Multi-User, Multiple Input, Multiple Output), and 1024-QAM modulation. It also enhances battery efficiency with Target Wake Time (TWT) and provides stronger security through WPA3 encryption.

The puck transmits sound and vibration data to the OBD-II device, which then relays the combined dataset to a smartphone app. This app serves as an intermediary, forwarding all raw data to backend servers, where the core computational analysis takes place. Rather than performing any processing locally on the puck or OBD-II module, the system relies on cloud-based AI algorithms to analyze engine behavior, ensuring robust and scalable processing capabilities.

A feature of this system is the use of Dynamic Time Warping (DTW) to align time-series data from multiple sources. Because sound, vibration, and OBD-II data streams operate at different sampling rates, DTW is applied to synchronize these disparate signals, allowing for accurate feature fusion and pattern recognition. By analyzing this fused data, AI-driven machine learning algorithms can identify wear patterns, detect early signs of mechanical degradation, and diagnose specific engine issues such as belt wear, engine knocking, and bearing failures. The AI model is trained on a vast dataset of normal and faulty engine behaviors, enabling it to distinguish between minor fluctuations and significant anomalies that require intervention.

Once the analysis is complete, the system generates a detailed diagnostic report, which is transmitted back to the user via the smartphone app. This report not only identifies potential mechanical issues but also provides an assessment of severity and actionable maintenance recommendations. By leveraging AI and multi-source data integration, this system surpasses conventional OBD-II diagnostic tools, which are limited to detecting electronic component failures but cannot assess physical wear and tear. The ability to recognize mechanical deterioration at an early stage allows vehicle owners to perform proactive maintenance, preventing more severe engine damage and costly repairs.

Combining real-time OBD data with synchronized sound and vibration analysis from the engine compartment creates several powerful synergies that enhance vehicle diagnostics, predictive maintenance, and overall safety. One is the ability to detect mechanical failures before they escalate into critical issues. While OBD data can identify sensor-detected anomalies such as misfires, fuel inefficiencies, or emissions failures, sound and vibration analysis can detect early signs of mechanical wear or failure that may not immediately register through sensor data alone. For example, a failing timing belt, worn bearings, or loose engine mounts may generate distinct noise and vibration patterns well before they trigger an error code.

Another synergy comes from improved predictive maintenance. By correlating vibration anomalies with specific OBD-reported issues, such as minor fuel trim variations or slight ignition misfires, an advanced diagnostic system can recognize degradation trends and predict failures with higher accuracy. This proactive approach helps prevent sudden breakdowns by identifying components that need service or replacement before they fail completely.

Enhanced fault isolation is another benefit. When a vehicle exhibits performance issues, OBD trouble codes alone may not always pinpoint the root cause. A check engine light for a cylinder misfire, for example, could be due to various factors such as a faulty spark plug, coil pack, fuel injector, or even a mechanical issue like a failing valve. By analyzing the sound signature and vibrations associated with the misfire, the system can distinguish between an ignition-related failure and a mechanical problem, reducing unnecessary part replacements and improving repair efficiency.

This integration also improves anomaly detection in complex systems where OBD may not provide complete coverage. For instance, a failing alternator bearing may produce a high-pitched whining noise long before it affects voltage output. A weakening serpentine belt may generate rhythmic vibration patterns before slipping enough to trigger an OBD error. Similarly, suspension and drivetrain issues, such as worn ball joints, CV joints, or wheel bearings, often produce audible clues or characteristic vibrations that may not trigger OBD alerts unless the failure affects ABS or stability control sensors.

Vehicle safety is further enhanced through early warnings of critical failures. Real-time synchronization of OBD data with vibration and acoustic signatures allows the system to detect developing issues in high-risk components such as brakes, steering, and transmission. A small but increasing imbalance in wheel vibrations, combined with changes in OBD sensor data, may indicate a developing tire or suspension issue that could lead to loss of control if left unaddressed.

Fuel efficiency and performance optimization also benefit from this approach. Fine-tuning engine parameters based on real-time vibration and acoustic feedback allows for adaptive engine control that minimizes inefficiencies. For example, subtle variations in combustion noise can indicate incomplete fuel burning, prompting adjustments in fuel injection timing and air-fuel ratios to maximize efficiency.

Finally, this integration improves fleet management and remote diagnostics. By continuously analyzing synchronized OBD, sound, and vibration data, fleet operators can monitor vehicle health remotely, anticipate maintenance needs, and reduce downtime. This reduces operational costs and enhances reliability, especially in commercial and logistics applications where vehicle uptime is critical.

By merging real-time OBD diagnostics with sound and vibration analysis, vehicle monitoring systems gain a deeper, multi-dimensional understanding of a vehicle's health. This combination leads to earlier detection of failures, improved maintenance planning, better fault isolation, enhanced safety, optimized performance, and more efficient fleet operations, making vehicles more reliable and cost-effective over time.

FIG. 1 illustrates a diagram 100 of an example embodiment of a system for vehicle diagnostics with synchronized vehicle acoustic and vibration data with OBD data. Vehicle 104 includes data link connector port 108 for outputting OBD data into OBD scanner 112. Vehicle 104 is fitted with puck 116, with exploded view 116'. Puck 116 includes one or more vibration sensors, such as accelerometer 120, one or more microphones, such as microphone 124, and a wireless data interface 126, suitably a Wi-Fi 6 interface.

Key microphone characteristics work to the system's effectiveness. A wide frequency response, typically from 20 Hz to 20 kHz or higher, ensures that both low-frequency vibrations and high-frequency sounds are captured. High sensitivity, with a recommended range of −40 dBV/Pa or better, allows the microphone to detect subtle noises like bearing wear or brake squeals. Directional microphones, such as cardioid or super-cardioid designs, help focus on specific components by minimizing noise from other directions, while omnidirectional microphones capture a broader sound spectrum for general diagnostics. A wide dynamic range, ideally between 60- and 100-dB SPL, ensures that both faint and loud sounds are accurately captured without distortion. A low noise floor below 20 dBA prevents microphone-generated noise from masking critical diagnostic signals. Additionally, microphones must be robustly designed to withstand engine bay conditions, including heat, vibration, moisture, and dust. Sampling rates of 44.1 kHz or higher are recommended for detailed sound analysis.

An accelerometer detects vibrations by continuously measuring changes in acceleration over time and converting this motion into electrical signals. When placed in an engine bay, the sensor experiences the same physical oscillations as the surrounding components, allowing it to capture both low-frequency and high-frequency vibrations. A triaxial accelerometer, which measures movement along three perpendicular axes (X, Y, and Z), enables detection of vibrations from multiple directions, making it highly effective for diagnosing mechanical irregularities. Each vibration produces a distinct acceleration pattern, which the sensor registers as a time-series signal.

As engine components move, subtle or pronounced vibrations generate variations in acceleration that can indicate specific mechanical conditions. High-frequency vibrations often correspond to issues such as worn bearings, loose fasteners, or belt degradation, while low-frequency vibrations may indicate problems like misalignment, unbalanced rotating components, or failing engine mounts.

There are several types of accelerometers used for vibration sensing in vehicle diagnostics, each with unique properties suited for different applications. MEMS (Micro-Electro-Mechanical Systems) accelerometers are compact, low-power sensors commonly used in automotive applications due to their ability to withstand harsh environments while maintaining high sensitivity. These accelerometers use microscopic mechanical structures that deform in response to vibrations, producing an electrical signal proportional to acceleration. Piezoelectric accelerometers, on the other hand, utilize a crystal or ceramic material that generates an electric charge when subjected to mechanical stress. These sensors are highly sensitive, making them ideal for detecting subtle vibrations in high-frequency applications, such as monitoring bearing wear and engine knocking. Capacitive accelerometers measure changes in capacitance between microstructures inside the sensor, offering good sensitivity for low-frequency vibrations and stability in long-term monitoring applications. Piezoresistive accelerometers function similarly but rely on resistance changes in a strain-sensitive material to detect acceleration, making them effective for capturing both static and dynamic forces, such as gradual misalignments and sudden impact events.

To improve accuracy, an AI model trained on a database of normal and faulty engine conditions can analyze the processed vibration data, identifying patterns that correlate with known failure modes. The AI can differentiate between normal operational vibrations and abnormal ones that signal emerging issues. In a diagnostic puck sensor, the accelerometer is suitably mounted on a rigid base, suitably a magnetic base, to ensure direct mechanical coupling with the engine bay, minimizing external noise and maximizing sensitivity. This placement allows for real-time vibration monitoring, ensuring early detection of engine anomalies before they lead to severe mechanical failures. By integrating accelerometer data with sound recordings and OBD-II engine metrics, the system provides a comprehensive analysis of engine health, improving predictive maintenance and reducing the likelihood of unexpected breakdowns.

For integrating into a puck sensor intended for automotive engine diagnostics, the GRAS 147AX CCP, by Grass Automotive solutions, Rugged Pressure Microphone is a suitable choice. This microphone is specifically designed for harsh environments, such as engine compartments, and offers a wide frequency range from 3.15 Hz to 20 kHz. It features a robust construction that resists shock, vibration, water, dust, and high temperatures up to 125° C. Additionally, it comes with a magnetic mounting system for easy and precise placement within confined spaces Another example microphone is the IM63D135A XENSIV™ MEMS Microphone by Infineon. This high-performance digital MEMS microphone is qualified according to automotive quality standards and is suitable for applications requiring a wide frequency response. It offers a flat frequency response down to 7 Hz, making it suitable for capturing a broad spectrum of engine sounds. The microphone is robust, capable of withstanding high sound pressure levels, and operates within a temperature range of −40° C. to 105° C.

For brake pad wear, the system can detect squealing, grinding, or thumping sounds that correspond to specific wear conditions. Squealing is typically caused by the pad wear indicator, grinding occurs when the pad backing contacts the rotor, and thumping indicates uneven wear or warped rotors. Frequency ranges from 1 to 5 kHz are particularly relevant for brake squeals. Microphones placed in strategic locations, such as near the wheel wells, help localize these sounds. The system can integrate OBD data, such as ABS sensor readings and brake fluid pressure, to confirm wear-related anomalies. Early detection of brake pad wear through sound analysis prevents costly damage to rotors and ensures vehicle safety.

Wheel imbalance produces low-frequency droning, humming, or thumping sounds that increase in intensity with speed. These vibrations can be felt in the steering wheel, seat, or floor. Microphones placed near the wheels can capture imbalance-related sounds, and multi-microphone setups allow for localization of the affected wheel. OBD data, such as vehicle speed and wheel speed sensor readings, provides additional context. By correlating sound frequencies with rotational speeds, the system accurately identifies imbalance issues. Combining these inputs with advanced machine learning models enhances the system's ability to distinguish wheel imbalance from other issues like tire tread noise or suspension problems.

Environmental sounds, such as road noise, wind, engine sounds, and urban traffic, present challenges to the diagnostic system. These external noises can mask diagnostic signals, but the system mitigates their impact through several methods. Directional microphones and beamforming isolate relevant sound sources, while digital filters remove frequencies outside the diagnostic range. Adaptive noise cancellation algorithms subtract background noise from the recorded signals, and machine learning models are trained to differentiate between diagnostic and environmental sounds. Contextual awareness, such as speed data and weather conditions, further refines noise filtering. Microphone placement within the engine bay or near wheel wells ensures minimal exposure to environmental noise while maximizing diagnostic accuracy.

When using microphones in aftermarket systems, mounting variations introduced by consumers can affect performance. Suboptimal placement or orientation, exposure to vibration, and environmental conditions can degrade sound quality and reduce the benefits of multi-microphone setups.

OBD scanner 112 includes processor 128, memory 132, communication module 136, user interface 140, power supply 144 and OBD connector interface 148. Data from DLC port 108 and from puck 116 is received into OBD scanner 112 via OBD connector interface 148, suitably comprising a Wi-Fi 6 interface.

Scanner 112 is in data communication with smartphone 152, or any suitable data device. Smartphone 152 is in data communication with cloud service 156 via network cloud 160. Network cloud 116 is comprised of any suitable wireless or wired data communication system and may comprise a local area network (LAN), a wide area network (WAN), why may comprised the Internet, or any suitable combination thereof. Cloud service 156 stores information including Vehicle Identification Number (VIN) information, DTC information, historical repair data, testing and diagnostic procedures, engine compartment information, vehicle feature matching information, manufacturer and aftermarket update information, user and maintenance logs, AL/ML data, and the like.

A VIN is a 17-character alphanumeric code that uniquely identifies a vehicle and provides key details about its manufacturer, model, features, and history. The VIN is structured into three sections: the World Manufacturer Identifier (WMI) (first three characters) identifies the country and automaker, the Vehicle Descriptor Section (VDS) (characters 4-9) details the model, body type, engine, and transmission, and the Vehicle Identifier Section (VIS) (characters 10-17) includes the model year, assembly plant, and a unique serial number.

Example embodiments provide an advancement in vehicle diagnostics by combining AI-driven analytics with a multi-sensor approach. The detachable puck sensor ensures convenient deployment, while its wireless communication with the OBD-II module enables seamless data collection without the need for intrusive installations. With a secure, cloud-based architecture and an AI model that learns from historical engine performance data, this system offers an high level of diagnostic accuracy. The integration of sound and vibration analysis with real-time OBD-II metrics provides a holistic view of engine health, making it possible to detect and address issues long before they lead to mechanical failure.

Cloud integration enhances the diagnostic system by enabling centralized data processing, real-time diagnostics, and predictive maintenance. The cloud server stores vehicle histories, VIN-specific data, and aggregated failure trends, providing personalized insights and improving model accuracy. VIN data ensures that diagnostics are tailored to the specific make, model, and year of the vehicle, accounting for unique specifications and failure patterns. Cloud-based machine learning models evolve continuously, adapting to new data and providing fleet-wide insights for commercial users. The system supports remote monitoring, seamless integration with third-party services, and secure data storage.

This provides a vehicle diagnostic system that combines high-quality microphones, OBD data, cloud integration, and machine learning offers precise, early detection of mechanical issues. By overcoming challenges like environmental noise and consumer mounting variability, the system provides reliable, real-time diagnostics and predictive maintenance recommendations, ensuring vehicle safety and efficiency.

Figure 2:
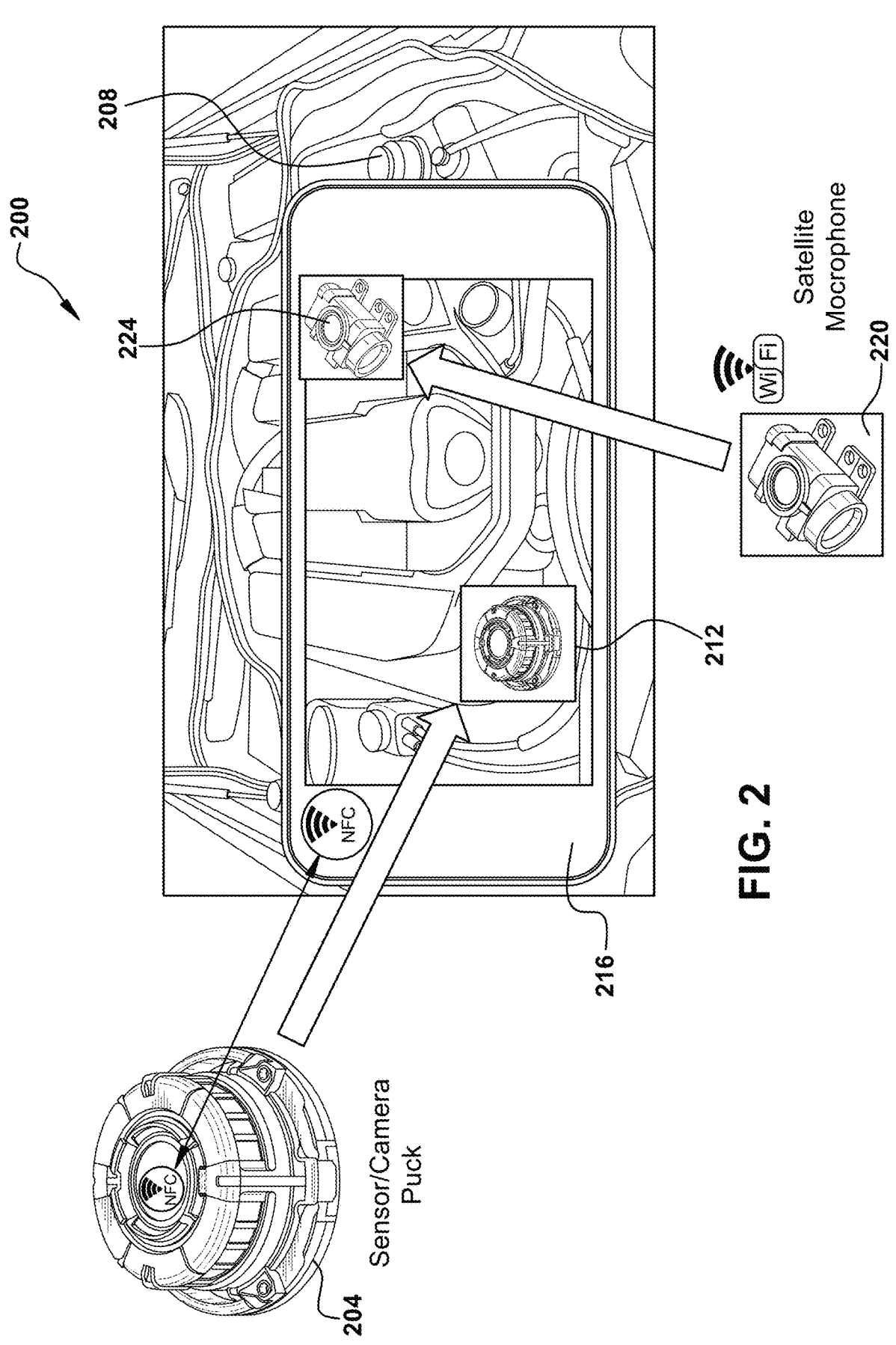
FIG. 2 illustrates an example embodiment of a vehicle engine compartment microphone/vibration sensor puck installation.

FIG. 2 illustrates an example embodiment of a vehicle engine compartment microphone/vibration sensor puck installation 200. Microphone/vibration sensor puck 204 is positioned within engine compartment 208 at position 212. Placement of the puck sensor in an engine compartment is critical for capturing accurate sound and vibration data while ensuring durability and minimal interference from external factors. The ideal locations depend on the type of engine issues being diagnosed, the structure of the engine bay, and heat and vibration exposure. Placing the sensor near the engine block, particularly on the valve cover or close to the timing chain, is ideal for detecting engine knocking, misfires, valve train noise, and timing chain wear. The engine block is a primary source of mechanical vibrations and sound, making it an optimal location for monitoring ignition timing anomalies and knocking.

Another effective placement is near the engine mounts, where excessive vibration, worn engine mounts, or engine misalignment can be detected. Engine mounts absorb and transfer vibrations, so securing the puck sensor close to a rubber or hydraulic engine mount allows for the monitoring of stability. Positioning the sensor near the accessory belt or timing belt area is useful for diagnosing belt wear, pulley misalignment, and bearing failures. Belts and pulleys generate specific vibration patterns that change as they wear out, making this an ideal spot for vibration analysis. To ensure safety, the sensor should be positioned near the serpentine belt or timing belt cover but away from moving parts.

Mounting the puck close to the fuel injectors or intake manifold is beneficial for detecting fuel injector misfires, irregular combustion, and air intake issues. Fuel injectors and intake manifolds emit unique acoustic and vibration signatures that indicate misfires or clogging, making the fuel rail or throttle body a strategic placement location. For exhaust-related diagnostics, positioning the sensor near the exhaust manifold or turbocharger can help identify exhaust leaks, turbocharger bearing wear, and heat-induced expansion issues. The exhaust system generates distinct low-frequency vibrations that change when components degrade. To prevent damage, the puck should be secured on a heat-resistant bracket that minimizes excessive heat exposure while maintaining acoustic proximity.

Transmission housing placement is another valuable location for identifying gearbox wear, torque converter issues, and drivetrain imbalances. The puck can be attached to the transmission bell housing or torque converter shield to capture transmission vibrations that reveal worn bearings, misaligned gears, or torque converter slip. Additionally, chassis or subframe mounting points offer insight into vibration transmission issues and frame-mounted engine vibrations. Since the chassis absorbs engine vibrations, deviations from normal patterns can indicate excessive wear, making a structural mounting bracket near the engine bay an ideal placement area.

General considerations for placement include avoiding direct contact with high-heat areas, using heat shields or thermal insulation if mounting near the exhaust or turbo, and minimizing exposure to excessive road noise and wind interference. The sensor should be securely mounted using a magnetic base, adhesive, or bolt-on bracket to prevent shifting and should be positioned away from high-power ignition coils and alternators to minimize wireless interference. The right placement ensures precise and reliable data collection, improving diagnostic accuracy for early detection of mechanical issues.

If prioritizing vibration sensing, the puck should be secured on a structural engine mount or transmission bell housing to capture engine mounting stability, gearbox wear, and drivetrain harmonics. However, this would compromise sound-based diagnostics, as structural mounts dampen high-frequency sound waves. Conversely, if prioritizing acoustic sensing, mounting the puck closer to the intake manifold or near the fuel rail allows for better detection of airflow anomalies, injector failures, and intake valve noise, but at the expense of some vibration clarity.

A sweet spot for placing the puck sensor to capture as much relevant information as possible depends on balancing sound and vibration exposure, heat resistance, and minimal interference from extraneous noise. An optimized location provides a clear acoustic path for sound waves, a strong mechanical connection for vibration transfer, and access to key engine components responsible for faults and wear. Such a location is suitably on the engine block near the valve cover or cylinder head, slightly offset from the fuel injectors and intake manifold. This location allows the puck to detect engine knocking, combustion irregularities, fuel injector misfires, timing chain noise, belt slippage, and internal wear while also capturing the structural vibrations of the engine itself. The valve cover transmits mechanical vibrations well, while also providing a relatively direct acoustic pathway for sound propagation. This area is less exposed to extreme exhaust heat compared to locations near the turbocharger or exhaust manifold, making it an ideal balance between durability and sensitivity.

Puck positioning is suitably accomplished via augmented reality through smartphone 216 with information provided by a cloud service. In example embodiment herein, the cloud servers also store vehicle engine compartment information for different brands, makes and model years. A vehicle type is suitably identified by VIN information, available through the vehicle OBD port. In another example embodiment, smartphone 216 is configured for short range wireless data communication with puck sensor 204, suitably via near-field communication (NFC). Puck sensor 204 includes NFC tag 218 that, when proximate to smartphone 216, communicates puck identification data to the smartphone.

Figure 7:
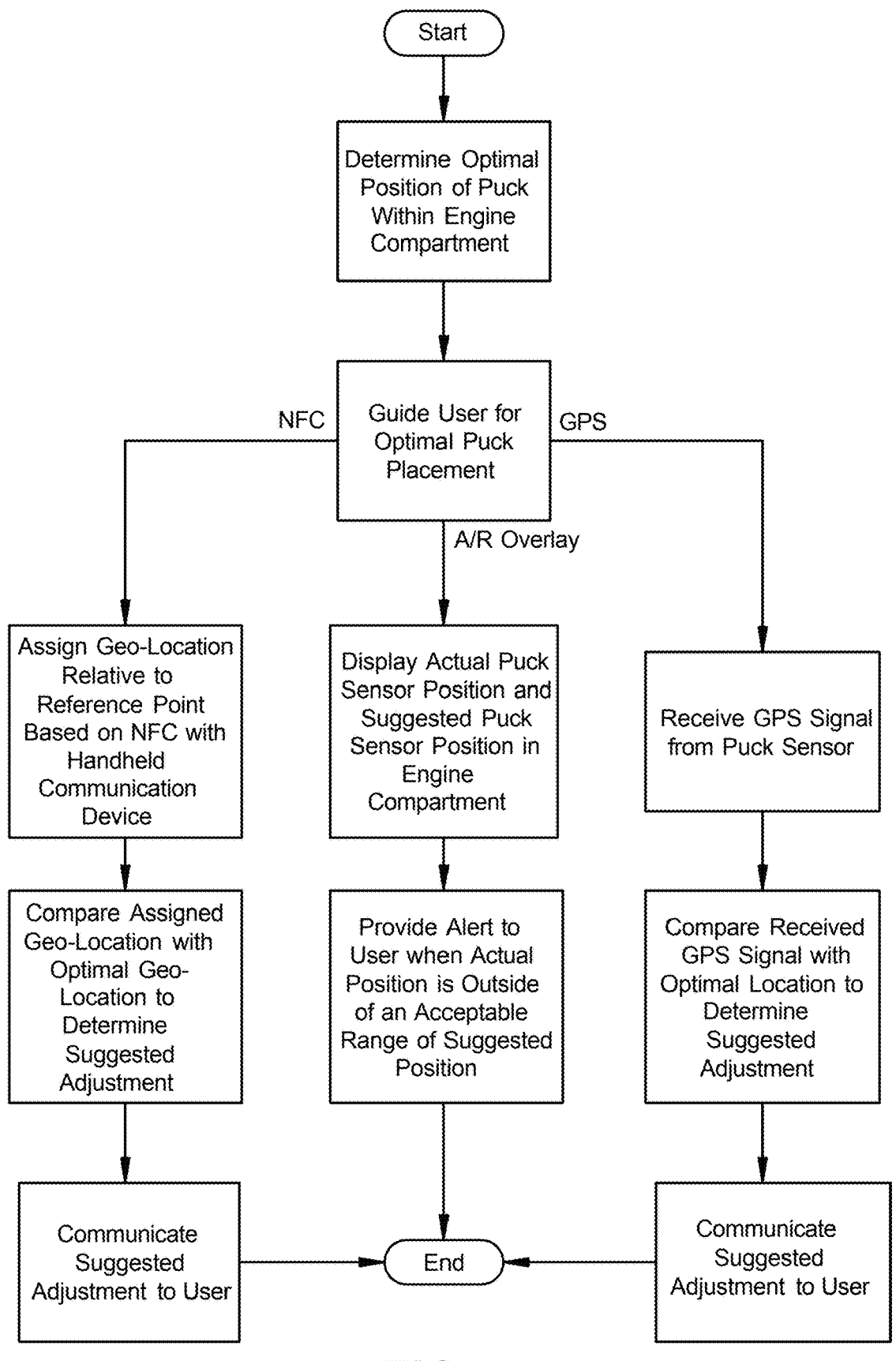
FIG. 7 illustrates a flowchart of example embodiments of a process of optimal puck sensor placement in an engine compartment.

According to one embodiment, and referring now specifically to FIG. 7, the NFC communication may be used in the process of guiding user placement of the puck sensor 204 within the engine compartment. The nature of NFC communications requires close proximity between the puck sensor 204 and the device (e.g., a smartphone) communicating with the puck sensor 204. The smartphone (or other handheld electronic device) may be configured to autonomously tag the geo-location where the communication between the smartphone and the puck sensor 204 occurs or is established. The smartphone may further be configured to associate that location with the puck sensor 204. In one embodiment, and referring specifically to the left-most branch of the flow-chart in FIG. 7 (e.g., the NFC branch), the location associated with the puck sensor 204 may be determined relative to a known reference point. For instance, the user may be asked to place their smartphone on a known location in the engine compartment, such as at the washer fluid cap, and make an entry to signify/mark that the smartphone is at that known location. Then when the NFC communication is established with one or more puck sensors 204, the geo-location for each of the puck sensors 204 may be determined relative to the marked point of reference. Thus, the sensed location of each of the puck sensors 204 may be obtained, and compared with an optimal location to determine a suggested adjustment, which may be communicated back to the user. For instance, the suggested adjustment may include specific instructions (e.g., "move puck sensor 4 inches towards the front of the vehicle, and 2 inches up", or "move the puck sensor to the top of the component highlighted on the virtual reality display") that may be displayed or conveyed audibly to the user.

In another example embodiment, and referring now to the middle branch (e.g., the A/R Overlay branch) of the flow chart in FIG. 7, there is depicted augmented reality/virtual reality features used in combination with the puck sensor 204. For instance, the augmented reality/virtual reality features may be used for puck sensor placement, as well as to provide some context to puck sensor output. In this regard, engine compartment images are structured in a virtual reality (VR) environment generated from model data stored at the cloud server and associated with the VIN-identified vehicle. The cloud server suitably stores digital engine compartment models, which may include three-dimensional CAD data, exploded parts diagrams, service manuals, and spatial metadata identifying engine bay dimensions, component boundaries, and mounting points. For each vehicle brand, model, and year, the server can further store correlation data between the VIN and specific engine variants, including optional equipment that alters compartment layout (e.g., turbochargers, battery relocation kits, or aftermarket accessories). When the VIN information and puck identification are communicated to the cloud server, the server retrieves the corresponding compartment model and overlays recommended/optimal puck placement positions/locations/regions based on both the vehicle geometry and sensor characteristics (for example, a puck with a directional microphone is optimally oriented toward belts or bearings, whereas a vibration-focused puck is optimally mounted on block or cover surfaces). Thus, the optimization of the puck sensor 204 may not only pertain to puck sensor 204 location within the engine compartment, but also puck sensor 204 orientation relative to engine components.

The VR environment is communicated to the smartphone (or other user device) and displayed in interactive form. Within this session, compartment components are rendered as virtual objects that the user can select, rotate, or temporarily remove from view. For example, the user may virtually "lift off" an air filter housing, rotate a coolant reservoir, or move a radiator shroud, revealing underlying mounting zones that might otherwise be hidden. Such interactive manipulation allows the user to preview how and where the puck may be placed before physically accessing those areas. The VR system may highlight valid puck placement points with overlays such as glowing icons or color-coded zones.

In practical implementations, the VR functionality is suitably accomplished using commercially available toolkits such as Unity3D or Unreal Engine for rendering, ARKit (Apple) or ARCore (Google) for camera tracking, and CAD-to-AR pipelines such as Siemens Teamcenter or Autodesk Forge to convert OEM engineering data into interactive 3D models. Vehicle manufacturers and third-party service providers already maintain large libraries of CAD and parts diagrams that can be integrated into the cloud service. By leveraging these existing resources, the system can deliver a fully interactive VR session on the user's smartphone, combining engine-specific data from the cloud with local rendering capabilities, to provide precise, visual, and user-assisted puck placement guidance.

Example, available technology suitably implemented for VR in this context include:

| Task | Details & Examples |
|---|---|
| Locate & visualize parts in AR | I-Mechanic, Hyundai VR Guide, Genesis AR Manual, Porsche PARiS |
| Guided repair instructions (AR) | I-Mechanic, Hyundai, Genesis, Porsche |
| AI-powered repair assistance | MECH.AI (diagnostics, parts lookup, guidance) |

The augmented reality/virtual reality features may be enhanced by artificial intelligence (AI) resources that may extend the various functionalities. For instance, the AI resources may be able to identify which puck sensor functionalities are desirable for a particular vehicle and/or vehicle symptom. AI-resources may also provide diagnostic assessments based on the data gathered by the puck sensor(s) 204, as well as instructions for completing repairs. AI-resources may also provide instructions for altering operational conditions of the vehicle during testing, such as revving the engine at a certain RPM for a prescribed period of time to analyze certain sounds, vibrations, temperatures, OBD data at that operational condition.

The right-most branch (e.g., the GPS branch) of the flow chart in FIG. 7 relates to use of a GPS sensor in the puck sensor 204 for use in puck sensor placement. The puck sensor 204 may emit a GPS signal, either in response to a specific request or in response to NFC communication between the puck sensor 204 and the smartphone. The geo-location associated with the received GPS signal may be compared with an optimal location to determine a suggested adjustment, which may be communicated to the user, either visually or audibly.

As noted above, NFC communication may also be used to identify the puck sensor 204 for purposes of determining the functionality thereof. However, the identification data may also be obtained from the puck sensor 204 via alternate modalities, such as via an electronic ID retrievable from the puck sensor 204, or via an ID physically present on the outside of the puck sensor 204, which the user may capture via a photograph, or simply enter via the user's electronic device (e.g., smartphone 216). The puck sensor 204 may also include icons associated with prescribed functionality that may be visual indicators to the use and/or a camera, which may be used to identify puck sensor functionality. In this regard, the system may allow the user to enter the puck sensor functionality, as may be determined by the icons or other indicia located on the puck 204. Smartphone 216 suitably communicates the puck identification to the cloud server, along with the VIN information. The cloud server associates properties of puck 204, such as embedded sensors or embedded microphones to determine puck placement. Sensor properties, coupled with the VIN identified vehicle, facilitate a determination of optimal engine compartment placement for the identified puck for the particular vehicle. An engine compartment image is communicated for display on the smartphone touchscreen along with an indication as to optimal puck placement relative to the image.

Referring back to overlayed data images via virtual reality or augmented reality, in other embodiments, diagnostic data such as thermal, vibration, or acoustic measurements may be overlaid onto engine compartment images or CAD-derived models. For example, smartphone-based thermal imaging devices such as FUR ONE or Seek Thermal modules provide temperature maps directly over camera images. Acoustic mapping systems, such as those commercially available from Brüel & Kjær or CAE Systems, visualize noise or vibration intensity as color overlays on photographs or CAD drawings. Video-based vibration amplification systems, such as the IRIS M platform, allow subtle vibration modes to be displayed as exaggerated overlays on live or recorded video. Industrial AR platforms, such as PTC Vuforia, Siemens Teamcenter Visualization, or Autodesk Forge, demonstrate how CAD data can be combined with measured information to provide interactive overlays in maintenance contexts. These technologies illustrate how measured vibration, acoustic, or thermal data is suitably displayed on images or VR/AR models of the engine compartment to guide sensor placement and enhance diagnostics.

Modern vehicles may include a sensor docking port, mounting port, or embedded sensor station, providing both mechanical attachment and electrical connectivity for seamless integration of one or more puck sensors. Suitable designs feature a pre-wired sensor hub or accessory interface point, where electrical connections are available but require additional mounting provisions. In other cases, manufacturers reserve an integration bay, expansion zone, or a socket as a designated space for future installations without pre-installed wiring. These configurations provide for streamlined sensor additions, ensuring compatibility with OEM diagnostics and aftermarket upgrades and a wired data channel for inter-device communication. Once a vehicle is identified by its VIN, a rendering of the engine compartment and puck positioning information is suitably sent to the smartphone display. This provides the augmented reality view of the engine compartment through the smartphone camera and display.

In another example embodiment, the system may be particularly useful when deployed in a mobile mechanic scenario, building on the NFC-assisted identification and puck sensor placement techniques described above. A mechanic arriving at a customer's location may connect the OBD-II dongle to the vehicle to retrieve VIN and performance data, while also deploying one or more puck sensors 204 within the engine compartment.

The NFC functionality of the puck sensors 204 to aid in puck sensor identification, in combination with the VIN-based VR overlays generated on the mechanic's smartphone, enables rapid and iterative positioning of the sensors until the system confirms optimized placement for the target vehicle. In this context, the mechanic is guided visually to mount the puck sensors 204 in locations best suited for capturing audio, vibration, thermal, and image data, depending on the suspected fault type or vehicle configuration.

Once positioned, the puck sensors transmit multi-modal data wirelessly to the OBD-II dongle, which aggregates the sensor streams with diagnostic data from the vehicle's ECU. The combined dataset is relayed via the mechanic's smartphone to the backend server, where Dynamic Time Warping (DTW) aligns the asynchronous signals and Hidden Markov Models (HMMs) classify wear patterns and detect anomalies.

The server then returns a diagnostic report to the mechanic's mobile device, providing an analysis of probable fault sources, the severity of the condition, and recommended corrective actions. In this way, the system enables a mobile mechanic to deliver professional-grade, AI-driven diagnostics directly at the customer's home, eliminating the need to transport the vehicle to a service center and ensuring faster, more accurate repairs.

Also illustrated is a satellite microphone 220, installed at position 224. One or more satellite microphones, such as satellite microphone 220, are also suitably positioned in conjunction with augmented reality. With one or more satellite microphones, the system gains enhanced spatial sound coverage, improving its ability to localize engine anomalies and isolate specific fault sources. Instead of relying on a single-point measurement, multiple microphones placed at strategic locations in the engine bay allows for multi-directional sound analysis, reducing background noise interference and improving diagnostic precision.

The system is suitably designed to selectively enable the microphone in two primary ways: at fixed intervals or when triggered by an event such as a detected sound pattern or a DTC from the OBD-II system. This selective activation allows for power savings while ensuring that the system captures relevant data when needed.

For fixed-interval operation, the microphone is powered on according to a predefined schedule, such as recording sound data for a few seconds every minute or activating for a longer duration at specified engine operating conditions, such as high RPMs or heavy loads. This method is useful when continuous monitoring is not necessary, and periodic sampling is sufficient for detecting engine health trends. The microphone remains in a low-power state when inactive and wakes up at predetermined times to record and transmit data.

In event-driven activation, the system remains in a low-power listening mode, where the microphone is in an ultra-low-power state but still capable of detecting sudden acoustic anomalies. When an abnormal sound pattern, such as knocking or belt squeal, is detected, the microphone fully powers on to capture high-resolution audio for further analysis. Alternatively, the microphone can be activated by an OBD-II DTC, where the system monitors real-time OBD-II data and enables sound recording only when a trouble code is triggered. For example, if a misfire DTC appears, the microphone can immediately wake up to capture engine noise that could provide additional diagnostic insights.

To maximize power efficiency, the system suitably incorporates one or more power-saving schemes. One approach is duty cycling, where the microphone is only active for a small fraction of the time, reducing energy consumption. Another method is adaptive sampling, where the microphone remains in a low-resolution monitoring mode and only switches to high-fidelity recording when a potential fault is detected. A hierarchical power management strategy can also be used, where the main processing unit and wireless communication modules remain in a deep sleep state, while only a lightweight detection circuit stays active to listen for sound triggers or monitor DTC signals.

For even greater efficiency, the system suitably uses a wake-on-sound mechanism, in which a low-power microphone or dedicated audio chip listens continuously for predefined acoustic signatures. If the detected sound matches certain characteristics, such as a knocking frequency range, the main microphone and processing unit are activated to capture detailed data. This technique minimizes unnecessary wake-ups and extends battery life in vehicles where the puck sensor operates independently of vehicle power.

By implementing these power-saving techniques, the system ensures that sound data is captured only when necessary, preserving energy.

With satellite microphones, the system can better differentiate between sound sources, such as engine knocking, belt slippage, injector misfires, and exhaust leaks, by analyzing how sound propagates across different points in the engine bay. Placing one microphone near the intake manifold, another near the exhaust manifold, and a third near the accessory belt system would provide a comprehensive audio profile of the engine's operation, enabling the AI to perform acoustic triangulation and filter out irrelevant noises.

Additionally, satellite microphones help overcome the limitations of single-microphone diagnostics, particularly in noisy environments where road and wind noise may interfere with engine sound analysis. By using beamforming and noise cancellation algorithms, the system isolates and amplify critical frequencies associated with mechanical wear and combustion irregularities, making fault detection more accurate and responsive.

A combination of vibration sensing from the puck and spatial sound analysis from satellite microphones provides a richer dataset for AI-based diagnostics, allowing the system to detect early-stage mechanical failures with greater confidence and precision. This multi-sensor approach would be especially useful for tracking progressive wear over time, providing more reliable predictive maintenance recommendations to prevent catastrophic engine failures before they happen.

Further example embodiments that benefit from multi-microphone configurations comprise microphones arranged in a single puck and aimed in different directions. This variant enhances spatial resolution by capturing sounds from various components and allows for directional sound localization, which is critical for pinpointing the source of mechanical issues like knocking, belt wear, or wheel imbalance. These microphones can be used with beamforming algorithms to focus on specific sound sources and suppress background noise. By triangulating sound sources and analyzing intensity variations, the system can distinguish between overlapping sounds, such as engine knocking and belt squeals.

In the illustrated example, data communication is established between puck 204 and satellite microphone 220 via Wi-Fi, such as Wi-Fi 6 due to its robust data capability. Wi-Fi at 2.4 GHz is advantageous in situations where obstructions that may attenuate higher frequencies, such as 5 GHz or 6 Ghz usable by W-Fi 7. Wi-Fi 7 is advantageous given its ability to use all three frequencies, alone or concurrently, shifting frequencies as needed to secure the best data connection.

FIG. 3 illustrates a flow diagram 300 of an example embodiment of a system for vehicle diagnostics with synchronized vehicle acoustics and on-board diagnostic sensor data. The system includes detachable puck device 304. Sound data 308 captured from one or more microphones is extracted using processing techniques o Fast Fourier Transform (FFT) and Mei-Frequency Cepstral Coefficients (MFCCs). These methods help convert raw time-domain sound signals into frequency-based features, which can then be used for fault detection, pattern recognition, and AI-based diagnostics. This is suitably accomplished as follows:

Step 1: Capturing Raw Sound Data

When the puck sensor and satellite microphones record engine noise, they produce a time-domain signal, which is essentially a waveform representing changes in sound amplitude over time. While this raw waveform contains useful information, it is difficult to interpret directly because different mechanical faults have unique frequency characteristics that are not visible in the time domain.

Step 2: Applying Fast Fourier Transform (FFT) for Frequency Analysis

The Fast Fourier Transform (FFT) is used to convert the time-domain signal into a frequency-domain representation. This allows the system to break down the complex sound wave into its individual frequency components.

1. Convert Time to Frequency

FFT analyzes the recorded sound waveform and outputs a spectrogram showing which frequencies are present at any given moment.

Engine sounds, such as knocking, belt wear, or injector misfires, have unique frequency signatures that can be identified in the transformed data.

2. Identify Dominant Frequencies and Patterns

Different mechanical faults generate vibrations and acoustic signals at distinct frequencies:

Engine knocking typically occurs between 5-10 kHz.

Belt wear or slippage generates lower-frequency noise, typically around 300 Hz-1 kHz.

Bearing failures produce high-frequency harmonics, often above 10 kHz.

By analyzing the spectral peaks of the FFT output, an AI model can compare the detected frequency patterns to a database of known failure signatures.

3. Filter Out Noise and Unwanted Frequencies

The FFT output can be filtered to remove irrelevant frequencies, such as road noise or background interference.

Band-pass filters can isolate frequency ranges of interest based on engine speed, load conditions, and known fault characteristics.

Step 3: Extracting MFCCs for AI Feature Recognition

While FFT provides a general frequency breakdown, it does not account for how human-like perception processes sound, which is crucial for detecting subtle faults. Mel-Frequency Cepstral Coefficients (MFCCs) are extracted to mimic human auditory perception by focusing on perceived loudness and pitch changes, which are often more relevant for fault detection.

1. Convert to Mel Scale

The Mel scale is a logarithmic frequency scale that better represents how human ears perceive sound.

It gives more weight to lower frequencies, which is useful because many engine faults, like knocking and misfires, produce subtle low-frequency changes.

2. Compute Cepstral Coefficients

The signal is divided into small time windows (e.g., 20-40 milliseconds).

A Fourier Transform is applied to each window to extract short-term spectral information.

The logarithm of the Mel-filtered spectrum is taken to emphasize differences in amplitude and energy.

A second Fourier Transform is applied to obtain the MFCCs, which capture the most useful speech-like features of the sound.

3. Use MFCCs for AI-Based Fault Detection

The AI model is trained on a dataset of normal and faulty engine sounds, with MFCCs as the input features.

When new sound data is captured, its MFCCs are compared against known failure patterns to classify engine conditions.

Subtle differences in harmonic content, phase shifts, and amplitude variations help distinguish between different types of failures.

Step 4: Combining FFT and MFCC Data for More Accurate Diagnostics

Both FFT and MFCCs are complementary:

FFT provides a broad overview of frequency components and highlights mechanical patterns.

MFCCs refine this by focusing on perceived sound variations, allowing AI models to detect early-stage faults that might be missed in raw FFT analysis.

The combined FFT-MFCC dataset is then fed into an AI-based predictive model, which compares it with historical engine health data. If deviations are detected, the system can flag potential failures, assess severity, and recommend maintenance actions. By using FFT for spectral breakdown and MFCCs for feature recognition, the engine diagnostic system can effectively convert raw sound data into actionable insights, improving fault detection accuracy and predictive maintenance capabilities.

Vibration data 312, suitably captured from an accelerometer. Two mathematical techniques are applied for vibration data analysis: Root Mean Square (RMS) and Spectral Density Analysis. These methods extract meaningful information from raw accelerometer signals by quantifying vibration intensity and breaking down its frequency components. This provides for diagnosing bearing wear, belt slippage, misalignments, and other mechanical anomalies.

Step 1: Capturing Raw Vibration Data

When an accelerometer embedded in the puck sensor records vibration, it produces a time-domain signal, representing changes in acceleration over time. This raw data contains valuable information but is difficult to interpret directly, as it consists of complex oscillatory motion caused by various engine components.

Step 2: Calculating Root Mean Square (RMS) for Vibration Intensity

RMS is used to quantify the overall vibration energy by computing an 'average magnitude' of the fluctuating acceleration signal. RMS is particularly useful for monitoring general vibration levels and detecting gradual increases in engine wear.

Compute RMS for a Given Time Window:

The raw acceleration signal, a(t), is squared at each time step to remove negative values:

$$a^2(t)$$

The squared values are averaged over a time window, smoothing out momentary fluctuations:

$$\frac{1}{T}\sum a^2(t)$$

The square root of the result is taken to obtain the final RMS value:

$$RMS = \sqrt{\left\{1 / T \sum_{(i=1)}^{N} a^{2(t)}\right\}}$$

Comparing RMS Against Baseline Values:

A baseline RMS value is established from a healthy engine under normal operating conditions. The current RMS value is continuously monitored. A sudden spike could indicate an emerging mechanical fault such as misalignment or unbalanced rotating parts. Threshold-based alerts can be set so that if RMS exceeds a predefined limit, the system flags excessive vibrations requiring maintenance.

Step 3: Using Spectral Density to Identify Vibration Frequencies

While RMS provides an overall vibration level, Spectral Density Analysis helps identify which frequencies contribute most to vibration, facilitating pinpointing the root cause of the problem.

Compute Power Spectral Density (PSD):

The Power Spectral Density (PSD) represents vibration energy distribution across different frequencies. To obtain PSD, the raw acceleration signal is transformed from the time domain to the frequency domain using the Fast Fourier Transform (FFT). The squared magnitude of the frequency components is then normalized over frequency, giving:

$$PSD(f) = \frac{|FFT(a(t))|^2}{\Delta f}$$

Identifying Fault Frequencies:

Different engine components vibrate at characteristic frequencies:

Bearing faults appear as high-frequency spikes (10 kHz-30 kHz range).

Unbalanced rotating parts show strong energy at the rotation frequency (e.g., crankshaft or belt vibrations).

Misalignments and looseness result in harmonics of the fundamental frequency.

By analyzing which frequencies are abnormally strong, the system can determine which component is failing.

Tracking Changes Over Time:

By continuously monitoring RMS and spectral density trends, the AI model tracks progressive wear patterns. If certain frequencies gradually increase in power, it indicates a worsening mechanical fault, prompting predictive maintenance recommendations.

Step 4: Combining RMS and Spectral Density for AI-Based Diagnostics

The RMS value provides an overall vibration level, while the PSD analysis isolates specific vibration sources. Both are fed into an AI-driven anomaly detection model, which compares them against historical baseline data to determine:

If the vibration is abnormal

Which component is responsible

Whether immediate maintenance is required or if it is a progressive issue

Thus, by using RMS for intensity monitoring and spectral density for fault localization, the vibration analysis system provides precise insights into engine health, ensuring early detection and reducing unexpected failures.

In FIG. 3, sound data 308 and vibration data 312 are communicated to OBD-II module 316, which module is also in data communication with a vehicle DLC to receive OBD-II data. Sound data, vibration data and OBD-II data are communicated to smartphone 320, which relays it to cloud service 342 via a backend server 328 at block 328. Cloud service 342 aligns time series data via dynamic time warping at block 332, aligns features via synchronized data at block 336, performs AI model processing at block 340. Cloud service 324 then sends a resulting report back to smartphone 320 via the back end server at block 344.

Dynamic Time Warping (DTW) is an algorithm designed to measure the similarity between two time-series data sequences, even when they vary in speed or timing. It is particularly useful in applications where time alignment of sequences is imperfect, such as comparing speech patterns, biological signals, or mechanical sound data. By dynamically aligning sequences, DTW enables accurate comparisons and analysis.

Time-series data typically represent signals recorded over time, such as sound waves, sensor readings, or vibrations. Comparing two sequences using simple methods like Euclidean distance fails when the sequences are misaligned in time. DTW overcomes this limitation by finding the optimal non-linear alignment between two sequences. For example, DTW can be used to compare engine vibration signals recorded at different RPMs or match a known brake squeal pattern to a captured audio sequence, even if the noise occurs at varying speeds. DTW can also synchronize real time OBD data with captured sound and/or vibration data.

An example DTW process begins with two input sequences, A and B, which can represent sound amplitudes or frequencies over time. A distance matrix, D, is constructed where each element represents the cost of aligning points from A and B. Typically, the distance is computed as the absolute or squared difference between corresponding points. Using this distance matrix, an accumulated cost matrix, C, is built to compute the minimum cumulative cost of aligning subsequences of A and B. Each element in the accumulated cost matrix is calculated based on the distance matrix and the minimum cost of prior alignments. The formula for computing the cumulative cost is:

$$C(i,j)=D(i,j)+\min\{C(i-1,j),C(i,j-1),C(i-1,j-1)\}$$

Here, C(i, j) represents the cumulative cost at position (i, j), and D(i, j) is the direct cost of aligning the ith element of A with the jth element of B. The cumulative cost matrix is initialized with the first element of the distance matrix, and boundary conditions are handled appropriately.

After building the accumulated cost matrix, the optimal alignment path is determined by tracing back from the bottom-right corner of the matrix, representing the minimum cost of aligning the entire sequences. The path is traced backward to identify the sequence of alignments that minimizes the total cost. The final output includes the alignment cost and the alignment path, which maps how the two sequences correspond over time.

The DTW process can be accomplished through several steps. Preprocessing ensures the sequences are normalized or scaled to eliminate bias from amplitude differences. Filtering techniques reduce noise, ensuring the sequences represent the same underlying signal. Distance calculation computes the pairwise differences, and dynamic programming constructs the cumulative cost matrix. Backtracking identifies the optimal alignment path, while post-processing interprets the alignment for analysis or diagnostics.

DTW is particularly useful in vehicle diagnostics for aligning and analyzing time-series data. It can compare captured engine sound or vibration data with reference patterns to detect anomalies like knocking or imbalance. By integrating OBD data, DTW aligns sensor readings such as RPM or fuel flow with audio or vibration data to improve diagnostics. In multi-microphone systems, DTW aligns sound signals from multiple microphones, enabling precise localization of sound sources.

The advantages of DTW include its ability to handle nonlinear variations, making it ideal for sequences that stretch or compress in time. It is robust to timing differences, allowing it to compare patterns even when one sequence lags or leads the other. Furthermore, it is customizable, supporting various distance metrics and constraints tailored to specific applications.

DTW is computationally intensive, requiring O(m×n) computations for sequences of lengths m and n. Optimizations such as FastDTW can reduce complexity while maintaining accuracy. Adding boundary constraints also limits excessive warping, avoiding unrealistic alignments and reducing computation time.

Figure 4:
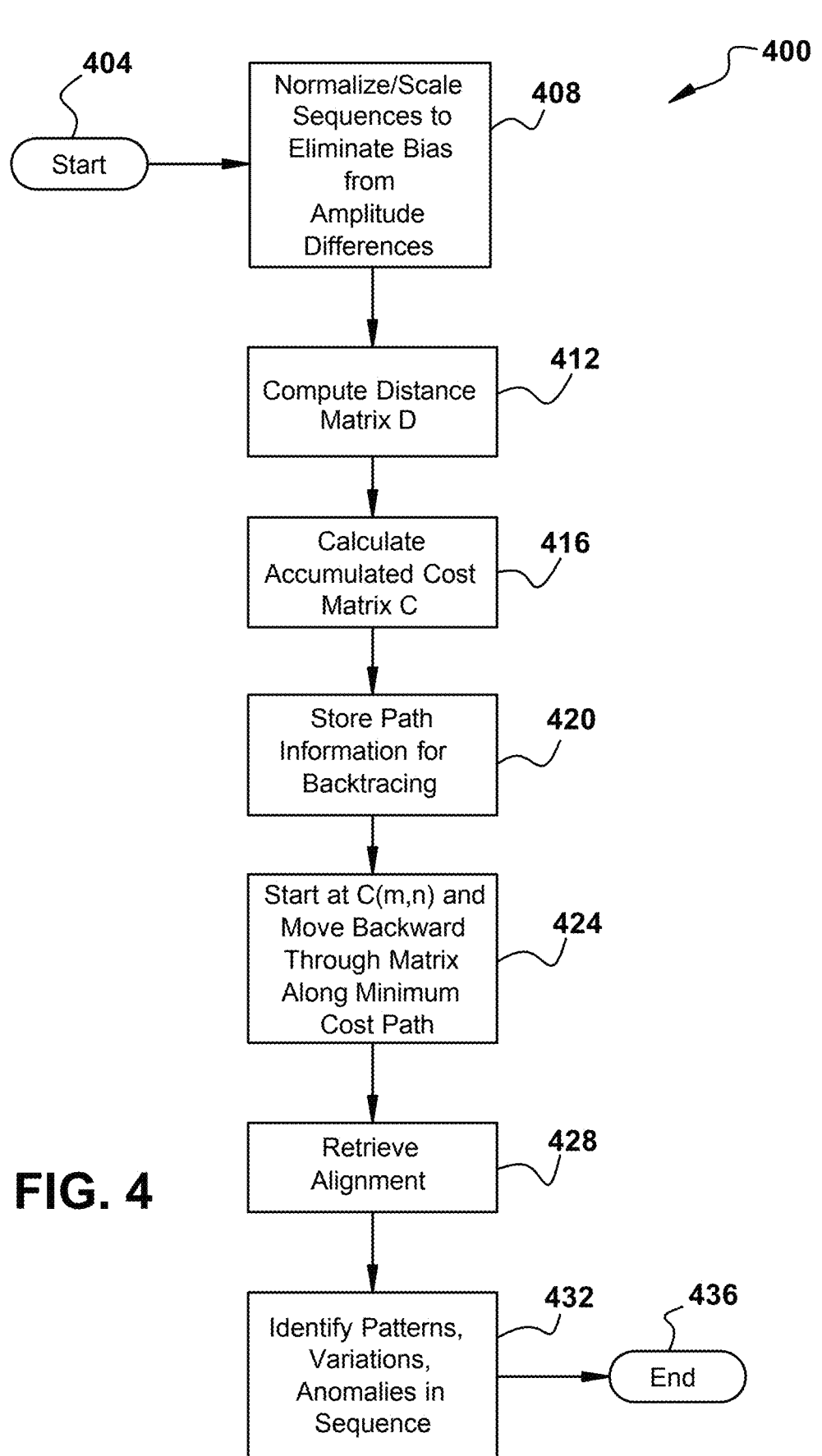
FIG. 4 is a flowchart of an example embodiment of dynamic time warping.

FIG. 4 illustrates a flowchart 400 of an example embodiment of DTW that commences at block 404. The illustrated example suitably includes two input sequences:

A=|a1, a2, . . . , am| (length m)
B=|b1, b2, . . . , bn) (length n)

These sequences suitably represent sound amplitudes or frequencies over time. The sequences are normalized and scaled at block 408 to eliminate biases form amplitude differences A distance matrix D with a size m×n is constructed at block 412 where each element D(i, j) represents a cost of aligning $a_i$ and $b_j$. This is suitably calculated as:

$$D(i,j)=|a_i-b_j|$$

D(i, j) determines similarity between points $a_i$ and $b_j$, such as their absolute or squared distance.

Next, an accumulated cost matrix is constructed at block 416 with the same m×n size. Each element C(i, j) contains a minimum cumulative cost to align A[1:i] with B[1, j]. A suitable calculation follows:

$$C(i, j) = D(i, j) + \min \begin{cases} C(i-1, j) \text{(insertion)} \\ C(i, j-1) \text{(deletion)} \\ C(i-1, j-1) \text{(match)} \end{cases}$$

C(1, 1) is initialized as D(1,1) and boundaries are addressed correspondingly. Path alignment begins at C(m, n), which is a bottom-right corner of the cost matrix which represents a minimum cost of aligning the sequences. Back tracking path information is stored at block 420. Backtracking is completed at block 424 through the matrix to determine an optimal alignment path, which minimizes a total alignment cost. A suitable path includes one or more diagonal moves (match), horizontal moves (insertions), or vertical moves (deletions). A total alignment cost C(m, n) is output showing how the sequences are mapped to each other over time. Sequence alignment is retrieved at block 428 and patterns, variations and anomalies are identified at block 432. The system then ends at block 436.

In DTW, "cost" refers to the numerical difference between corresponding points in two time-series sequences, representing how different they are. It helps determine the best alignment between the sequences by minimizing the total cumulative cost Types of Cost in DTW
Local Cost (Distance Measure):
This represents the difference between two individual points in the sequences being compared.
The most common local cost function is the absolute difference: D(i,j)=|ai−bj|
Other possible cost functions include squared differences ((ai−bj)2(a_i b_j)$^2$ (ai−bj)2) or more advanced metrics like cosine similarity.
Cumulative Cost:
This represents the minimum total cost of aligning the sequence up to a given point (i,j)(i, j)(i,j).
It is recursively computed as: C(i, j)=D(i, j)+min (C(i−1, j), C(i, j−1), C(i−1, j−1)).
Cumulative cost accumulates along an optimal alignment path, ensuring that the total alignment difference is minimized.
Below is an interpretation of cost in DTW:
Lower Cost: A better match between the two sequences.
Higher Cost: A greater difference, meaning the sequences are less similar.
Final DTW Cost C(m,n): A final value in the accumulated cost matrix represents the total minimum cost required to align the two sequences.
Example: In DTW for Sound for sound analysis, two engine sound recordings are compared. In such comparison, the local cost would measure how different the sound frequencies or amplitudes are at each time step. The cumulative cost would track the best overall alignment path between the two recordings, allowing for variations in timing (e.g., different RPM speeds).

FIG. 5 illustrates a flowchart 500 of an example embodiment of a system for vehicle diagnostics with synchronized vehicle acoustic and vibration data with OBD data. The process commences at block 504 and proceeds to block 508 where sound and vibration sensors capture information, suitably comprising high frequency data. OBD data is obtained with a lower sampling rate at block 512. The data streams are aligned via DTW ant block 516 and temporal event.

Matching on the aligned streams is completed at block 520. Features are extracted at block 524 and feature mapping and fusion is completed at block 528

Next, AI model training and optimization is completed at block 532 facilitating anomaly detection at block 534. Data collection is completed at block 538 and collected data is preprocessed at block 542. Data pre-processing in data analysis and machine learning is when raw data is cleaned, transformed, and structured to improve its quality and usability. This process includes handling missing values, removing duplicates, correcting inconsistencies, normalizing or standardizing numerical data, encoding categorical variables, and detecting outliers. Additionally, data may be filtered, aggregated, or transformed to align with the intended analytical model. Effective pre-processing enhances model accuracy, reduces noise, and ensures that algorithms can extract meaningful insights from the data, ultimately improving the reliability and efficiency of decision-making processes.

Next, pre-processed data is time stamp synchronized at block 546 and DTW alignment is completed at block 550. Feature fusion and AI analysis is completed at block 558, and final data processing is completed at block 566. Anomaly detection is then undertaken at block 566 facilitating wear pattern recognition and diagnostics at block 570. The process then ends at block 474.

An event-driven system reacts to specific conditions or triggers. Data collection or processing only occurs when a predefined event happens, such as a sudden increase in vibration, an abnormal sound, or the activation of a DTC. Event-driven systems do not operate continuously; instead, they wait for something significant to occur before responding. For example, a puck-mounted microphone in an engine compartment might remain in a low-power mode until it detects a knocking noise, at which point it begins recording.

An asynchronous system, on the other hand, does not rely on a fixed schedule or synchronized clock but still operates independently across different processes or components. Data may still be collected continuously, but it is not necessarily processed or transmitted at regular intervals. Instead of responding to an event, asynchronous systems handle tasks whenever resources are available or needed. For example, a puck vibration sensor might continuously collect data at different sampling rates based on engine speed, but instead of processing it immediately, the system buffers and transmits data only when a higher-priority task is completed.

In the context of puck sensors in an engine compartment, a system can be event-driven, asynchronous, or both. A sensor might operate asynchronously, recording data at variable time intervals rather than fixed sampling periods. However, it can also be event-driven, only waking up and transmitting data when a vibration threshold is exceeded or when an OBD-II DTC is triggered. While all event-driven systems are asynchronous, not all asynchronous systems are strictly event-driven, some may still perform background operations or periodic sampling without needing a specific trigger.

Standard, time series DTW is dysfunctional with asynchronous or event-driven data because it assumes that both sequences being compared have continuous, regularly sampled numerical values. DTW is designed to align two time-dependent sequences by allowing time shifts and warping the time axis, but it still expects that both sequences have a well-defined structure with a meaningful temporal order.

In asynchronous or event-driven data, signals are recorded at irregular time intervals, meaning that one sequence may have far fewer or more data points than another, with unpredictable gaps between observations. Standard DTW struggles in this case because it relies on a dense cost matrix, where each point in one sequence is compared to every point in the other. If data is missing or recorded at highly uneven intervals, standard DTW may force meaningless alignments, introducing errors.

For asynchronous or event-driven data, a modified version of DTW is used. A suitable method is event-based DTW, which aligns only key events rather than continuous signals. Another suitable method is interpolation or resampling, where asynchronous data is first transformed into a more uniform time grid before applying DTW. A more advanced method is Asynchronous DTW (ADTW), which extends standard DTW by incorporating temporal flexibility, allowing sequences with different time structures to be aligned based on event similarity rather than strict time mapping.

In the context of automotive diagnostics, if sensor puck data is collected asynchronously, such as vibration data sampled continuously but sound data recorded only when a noise threshold is exceeded, standard DTW will not correctly align these signals. Instead, event-based and adaptive DTW techniques must be used to properly correlate asynchronous data sources while preserving meaningful relationships.

Traditional DTW can be effectively applied to several types of continuously recorded numerical data from sensor pucks mounted in an engine compartment. One of the most useful inputs is vibration data captured by accelerometers inside the puck. Since vibrations from engine components occur as oscillating waveforms, DTW can compare vibration patterns over time to detect changes associated with bearing wear, belt misalignment, or excessive engine roughness. Even if engine speed varies, DTW can warp the time axis to align similar vibration signatures, making it possible to distinguish normal operation from developing faults.

Another suitable input is acoustic data from microphones within the puck. Engine noise, belt squealing, injector ticking, and knocking sounds fluctuate based on engine load and RPM. DTW allows for alignment of sound waveforms even if recorded at different times or under slightly different conditions, making it useful for detecting early-stage mechanical problems. For example, if a puck-mounted microphone captures a knocking sound pattern, DTW can compare it against known detonation or misfire sound signatures, helping to confirm a diagnosis.

Temperature readings from sensors in the puck can also be analyzed using DTW, particularly when monitoring the heating and cooling cycles of specific engine components. Since temperature changes occur gradually, DTW can align trends in temperature fluctuations to detect abnormalities, such as excessive heat buildup in a bearing or an engine component operating outside its normal thermal range. Comparing temperature curves from multiple pucks placed in different engine locations can further enhance diagnostic precision.

Magnetometer and Hall effect sensor data from pucks can also be used with DTW to analyze rotational speed variations in belts, pulleys, or shafts. If a puck sensor detects irregularities in the rotational motion of a component, DTW can align this data with previous normal patterns to highlight developing inconsistencies, such as belt slip or pulley misalignment.

In contrast, traditional DTW is not well suited for aligning event-based sensor activations, such as a puck microphone that only turns on when a loud noise is detected, or a vibration sensor that records data only when a threshold is exceeded. These event-driven recordings lack a continuous time basis for DTW to operate effectively. Instead, DTW works best when the puck sensors provide continuously sampled numerical data, where patterns and variations can be meaningfully aligned across different operating conditions.

Traditional DTW is designed for continuous time-series data where values are recorded at regular intervals. However, event-driven data such as Diagnostic Trouble Codes (DTCs) from an OBD-II system operates differently, with data points occurring irregularly and timestamps not being uniformly spaced. This mismatch creates challenges when applying traditional DTW.

One key issue is the irregular sampling and gaps in data. Traditional DTW assumes both sequences have values at every time step, but DTC codes appear sporadically, often only when a fault occurs. Unlike continuous signals such as engine RPM or vibration, DTC events may be separated by days or weeks. Applying DTW on such a dataset leads to large, meaningless gaps in alignment as the method forces a path through missing data points. Another issue is that DTC codes are often delayed or occur at inconsistent intervals due to internal ECU logic. An engine misfire DTC might be logged 30 seconds after the actual misfire event, while an oxygen sensor DTC might take minutes to appear.

Traditional DTW minimizes absolute timestamp differences, assuming a direct one-to-one relationship between points. However, with DTCs, two codes might be related even if they occur at very different times. One-to-one alignment also fails for sparse events. DTW creates a warping path that forces each data point in one sequence to match a point in the other sequence.

In event-driven data, many DTC codes have no direct counterpart in other sensors, meaning there is no continuous value to compare. If an OBD-II system logs a fuel trim issue at five minutes, but a vibration anomaly occurs at ten minutes, traditional DTW cannot establish a meaningful connection between them. Additionally, DTW assumes that time progresses sequentially and monotonically, meaning that once time advances, it cannot go backward. However, in event-driven data, an older fault code may be logged after a newer one, depending on ECU logic. This out-of-order sequencing confuses traditional DTW, which expects a strict left-to-right alignment.

Another major problem is that DTW relies on distance metrics such as Euclidean distance to determine alignment cost. However, DTC codes are categorical rather than numerical. Two DTC codes may be related, such as a Misfire DTC P0301 and a Knock Sensor DTC P0325, but traditional DTW cannot compute a meaningful numerical distance between them. To handle event-driven data like DTC codes, event-based DTW modifies the algorithm by ignoring missing data points, instead aligning only relevant events, using event similarity measures instead of numerical distances, allowing flexible time warping so that events appearing at different times can still be matched, handling unordered sequences by dynamically adjusting event positions, and using sparse cost matrices so alignment is based only on meaningful event pairs. Traditional DTW fails with event-driven data like DTC codes because it assumes continuous, regularly sampled values, whereas DTC codes are sparse, irregular, and categorical.

Event-based DTW solves these issues by allowing flexible event alignment, using categorical similarity instead of Euclidean distance, and adapting time warping constraints to fit real-world diagnostic patterns.

The following details a suitable, event-based DTW sequencing. The traditional Euclidean distance in DTW is expressed as:

$$d(x_i, y_j) = \sqrt{(x_i - y_j)^2}$$

In event-based DTW, a generalized distance function accounts for event timing differences and semantic similarity, given by:

$$d(x_i, y_j) = w_1 \cdot |t_{x_i} - t_{y_j}| + w_2 \cdot S(x_i, y_j)$$

Unlike standard DTW, where alignment follows a strict monotonicity constraint:

$$i \geq i', j \geq j'$$

Event-based DTW allows for more flexible alignments by adjusting the warping path dynamically. The optimal path calculation in DTW is determined recursively using the formula:

$$(i, j) =$$

$$d(x\_i, y\_j) + \min[[\{cases\}D(i-1, j)\backslash\backslash D(i, j-1)\backslash\backslash D(i-1, j-1)]][\{cases\}$$

The cost matrix is updated iteratively with:

$$D(i,j) = d(x_i, y_j) + \min(D(i-1,j), D(i,j-1), D(i-1,j-1))$$

In event-based DTW, the warping path constraint is adjusted to allow for time shifts within an acceptable margin, expressed as:

$$t_{x_i} \approx t_{y_j} \pm$$

The similarity function between two events is modeled as:

$$S(x_i, y_j) = e^{-\lambda|f(x_i)-f(y_j)|}$$

Where higher similarity leads to a lower cost in the DTW alignment process. Additionally, cross-correlation can be used to measure event alignment, formulated as:

$$C(\tau) = \sum_t x(t) y(t + \tau)$$

By applying these mathematical principles, event-based DTW can dynamically align sensor readings such as OBD-II fault codes, vibration spikes, and sound anomalies, even when their timestamps are not synchronized. This approach allows for more accurate diagnostics in systems where events occur at irregular intervals, improving the robustness of multi-sensor fusion techniques.

DTW provides one tool that aligns different recordings by stretching and compressing them so that matching features occur at the same point in the sequence. This makes the data comparable. However, DTW by itself does not explain what is happening inside the machine or predict what will happen next. Hidden Markov Processing fills this gap. It treats the machine as having a set of hidden "states" (such as normal operation, early wear, or severe fault) that cannot be directly observed but can be inferred from the aligned data. It uses a mathematical model to decide which state the machine is most likely in at each moment, to smooth out momentary noise, and to forecast how those states are likely to change over time. In combination, DTW gets the timing right, and the Hidden Markov Model (HMM) makes sense of it in a way that matches real mechanical behavior. This pairing not only tells whether a problem exists, but also shows where the machine is in the failure process and how soon it might worsen, information that can be crucial in preventing breakdowns.

DTW and HMM operate together to strengthen both detection and prediction of vehicle faults. DTW enables accurate alignment of asynchronous signals such as OBD-II data, engine compartment noise, and vibration or acceleration, ensuring that patterns can be directly compared even when they occur at different speeds or times. While DTW highlights similarities and differences in aligned sequences, it does not provide information about how faults evolve over time. HMM adds this dimension by modeling the system as a sequence of hidden states that correspond to real-world conditions, such as a component moving from normal operation, to minor wear, to degraded, and ultimately to failure. By combining DTW alignment with HMM state modeling, the system not only detects anomalies but also predicts their progression, reduces false positives, and provides more meaningful reports. For example, instead of simply flagging an abnormal knock, the system may determine that the knock is progressing toward a severe state within a predictable time or mileage window. This combination transforms the invention from a signal comparison tool into a predictive diagnostic model.

In certain embodiments, the system implements a probabilistic state inference layer based on HMM processing to improve accuracy, stability, and interpretability of diagnostic results. An HMM is a statistical model that represents the temporal evolution of a system through a finite set of unobserved, hidden states, where each hidden state produces observable outputs according to a defined probability distribution. The transitions between states are governed by a state transition probability matrix, where each element $a_{ij}$ denotes the probability of moving from state $S_i$ at time $t-1$ to state $S_j$ at time $t$:

$$a_{ij}=P(q_t=S_j|q_{t-1}=S_i)$$

The observable outputs, or emissions, correspond to the measurable signals acquired by the system, such as acoustic features, vibration signatures, and data derived from ECU telemetry. Each hidden state $S_j$ is associated with an emission probability distribution $b_j(o_t)$, which characterizes the likelihood of producing a particular observation $o_t$ when the system is in state $S_j$:

$$b_j(o_t)=P(O_t=o_t|q_t=S_j)$$

The Markov property applies, whereby the probability of entering a given state at a particular time depends only on the state at the preceding time step, simplifying inference and allowing efficient computation.

During operation, the system suitably applies HMM inference algorithms to determine the most probable explanation for the observed sequence of measurements. Suitably, these algorithms include the Viterbi algorithm, which employs dynamic programming to compute the single most likely sequence of hidden states that could have generated the observed outputs. The Viterbi procedure maintains, for each time t and state $S_j$, the highest probability $\delta_t(j)$ of any state path that ends in $S_j$ at time t:

$$\delta_t(j)=\max_i[\delta_{t-1}(i)\cdot a_{ij}]\cdot b_j(o_t)$$

The index $\psi_t(j)$ of the previous state producing this maximum is stored as a backpointer:

$$\psi_t(j)=\text{argmax}_i[\delta_{t-1}(i)a_{ij}]$$

The algorithm begins by initializing $S_1(j)=\pi_j\cdot b_j(o_1)$, where $\pi_j$ is the initial probability of state $S_j$. It then iteratively applies the recurrence to all subsequent observations. After the final time step, the most probable ending state is chosen as $q_t=\text{argmax}_j\delta_t(j)$, and the full state sequence is reconstructed by backtracking through the stored $\psi_t(j)$ values. This approach yields a temporally consistent interpretation of the data that avoids implausible state jumps and is computationally efficient for real-time or near-real-time processing.

In some embodiments, the system additionally applies the forward-backward algorithm to compute the probability of being in each possible state at each time step, given the complete sequence of observations. Unlike the Viterbi algorithm, which yields a single most likely state sequence, the forward-backward algorithm produces a full posterior probability distribution over the states at each point in time. This is particularly advantageous for applications that require uncertainty quantification or the combination of multiple plausible interpretations.

The algorithm consists of two passes through the observation sequence:

1. Forward pass—The system computes the "forward probability" $\alpha_t(j)$:

$$\alpha_t(j)=[\Sigma_i\alpha_{t-1}(i)\cdot a_{ij}]\cdot b_j(o_t)$$

Initialization:

$$\alpha_1(j)=\pi_j\cdot b_j(o_1)$$

2. Backward pass—The system computes the "backward probability" $\beta_t(j)$:

$$\beta_t(j)=\Sigma_i a_{ji}\cdot b_i(o_{t+1})\cdot\beta_{t+1}(i)$$

Backward initialization:

$$\beta_t(j)=1$$

3. Posterior probability computation:

$$P(q_t=S_j|O_1\ldots O_t)=[\alpha_t(j)\cdot\beta_t(j)]/\Sigma_k\alpha_t(k)\cdot\beta_t(k)$$

In some embodiments, the system further applies the Baum-Welch algorithm to learn or refine the HMM parameters, including the state transition probabilities $a_{ij}$, the emission probability distributions $b_j(o_t)$, and the initial state probabilities $\pi_j$, from training data. The Baum-Welch algorithm is a specialized form of the Expectation-Maximization (EM) procedure for HMMs and operates iteratively as follows:

1. Expectation step (E-step) Using the current HMM parameters, the system applies the forward-backward algorithm to compute the posterior probability $\gamma_t(j)$ of being in state $S_j$ at time t, and the joint posterior probability $\xi_t(i,j)$ of being in state $S_i$ at time t and in state $S_j$ at time t+1:

$$\gamma_t(j) = [\alpha_t(j)\cdot\beta_t(j)]\Big/\sum_k\alpha_t(k)\cdot\beta_t(k)$$

$$\xi_t(i,j) = [\alpha_t(i)\cdot a_{ij}\cdot b_j(o_{t+1})\cdot\beta_{t+1}(j)]\Big/$$
$$\sum_p\sum\text{-q}\ \alpha_t(p)\cdot a_pq\cdot \text{b\_q}(o_{t+1})\cdot\beta_{t+1}(q)$$

2. Maximization step (M-step) The system updates the HMM parameters to maximize the likelihood of the observed data under the current posterior probabilities:

$$\pi_j^{(new)} = \gamma_1(j)$$

$$a_{ij}^{(new)} = \Big[\sum_{t=1}^{T-1}\xi_t(i,j)\Big]\Big/\Big[\sum_{t=1}^{T-1}\gamma_t(i)\Big]$$

$$bj^{(new)}(o_k) = \Big[\sum_t :o_t=o_k\gamma_t(j)\Big]\Big/\Big[\sum_{t=1}^T\gamma_t(j)\Big]$$

These updated parameters are then used for the next iteration of the algorithm. The process repeats until the change in model likelihood between iterations falls below a predefined threshold, indicating convergence.

This expanded use of forward-backward for inference and Baum-Welch for parameter training enables the system to operate in both hard-decision mode (via Viterbi) and probabilistic mode (via forward-backward), while also adapting its internal model over time using new labeled or unlabeled data. This adaptability is particularly advantageous in environments where sensor conditions, operating profiles, or failure patterns evolve, ensuring the system remains accurate and relevant without requiring a full retraining from scratch.

In certain embodiments, the Hidden Markov Processing layer is used in conjunction with the DTW alignment described herein, whereas in other embodiments it may be used in place of DTW for temporal alignment and pattern matching. DTW, as disclosed in this application, is suitably employed to align multi-modal sensor data streams, such as audio, vibration, and OBD-II telemetry, that are recorded under different time scales, offsets, or operational conditions. By warping the time axes to minimize the distance between feature sequences, DTW produces a synchronized representation in which correlated events in each data stream occur at matching time indices. This alignment step facilitates direct feature-to-feature comparisons and coherent input to subsequent machine learning or state estimation modules.

When used together, DTW and HMM complement each other in that DTW first produces a temporally aligned set of multi-sensor features, and the HMM then interprets these aligned features as a sequence of physical states that evolve over time. The HMM adds capabilities beyond DTW alone by: (i) labeling each aligned time step with an interpretable state representing a component condition or fault stage; (ii) providing probabilistic confidence measures for each diagnosis; (iii) enforcing realistic, physically plausible state transitions to smooth out transient noise or flickering classifications; (iv) explicitly modeling fault progression over time so that early onset and subsequent deterioration can be tracked; (v) integrating asynchronous or non-simultaneous cues from multiple streams into a unified evolving state estimate; and (vi) forecasting likely future states and their probabilities based on the learned transition matrix. DTW ensures that physically related events are properly aligned in time, while the HMM ensures that the resulting diagnostic interpretation is temporally coherent, probabilistically robust, and progression-aware.

In alternative embodiments, the HMM may supplant DTW as the primary temporal modeling mechanism. In this configuration, the HMM's state transition structure inherently models time progression and can be trained to account for expected variability in observation timing without explicit warping. For example, the emission distributions $b_j(o_t)$ can be conditioned on operating context (such as engine RPM ranges) so that naturally occurring time-scale differences across recordings are absorbed into the probabilistic model. In these embodiments, the Viterbi algorithm's backpointer-based path construction effectively aligns sequences at the state level rather than at the raw feature level, eliminating the DTW stage and simplifying the processing pipeline.

In further embodiments, a hybrid approach may be used in which DTW performs coarse alignment across disparate sensor types or operating sessions, followed by HMM processing for fine-grained temporal smoothing and state sequence decoding. This hybrid method is particularly advantageous in scenarios where multi-modal inputs have significant time offsets or sample rate differences, yet the diagnostic outcome requires stable, progression-aware state estimation over extended operational intervals. By combining the precise temporal alignment of DTW with the probabilistic state modeling of an HMM, the system produces robust, interpretable, and predictive diagnostics well-suited for early fault detection, ongoing condition monitoring, and maintenance forecasting.

Figure 6:
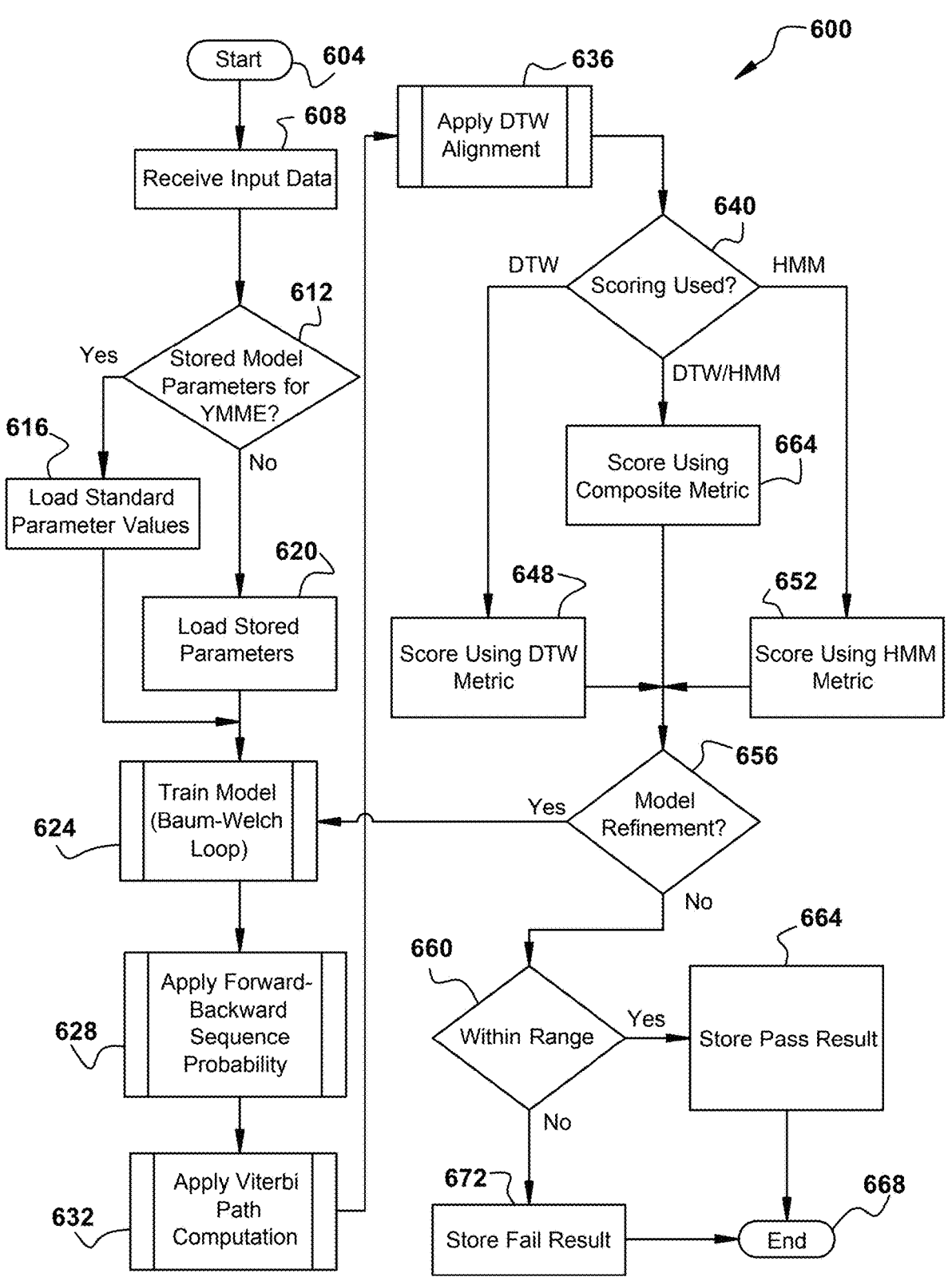
FIG. 6 illustrates a flowchart of an example embodiment of a sequential process for detecting, modeling, and classifying patterns in time-series data using statistical and machine learning techniques.

FIG. 6 illustrates a flowchart 600 of an example embodiment of a sequential process for detecting, modeling, and classifying patterns in time-series data using statistical and machine learning techniques. The process begins with raw input data acquisition, followed by preprocessing steps such as noise reduction and feature extraction. The extracted features are then evaluated and transformed into observation sequences, which serve as inputs to a HMM or similar probabilistic framework. The HMM parameters are initialized, trained, and iteratively refined using algorithms such as the Baum-Welch method, with state sequences and probabilities derived via the Viterbi algorithm. The resulting model outputs are subsequently validated against ground truth data, and final classifications or predictions are generated for downstream applications such as anomaly detection, predictive maintenance, or diagnostic decision-making.

The system starts at block 604 and process to block 608 where it begins by receiving time-series diagnostic data from the vehicle's sensors and control modules through the OBD interface or other telemetry sources. This data may include multiple parameters such as voltages, resistances, waveforms, and derived metrics. The data is pre-processed to align timestamps, normalize scales, and remove obvious noise or corrupt samples. This ensures the sequence is suitable for statistical modeling and sequence alignment.

The HMM is initialized with the number of hidden states, observation symbols, initial probability distribution, state transition probabilities, and observation emission probabilities. If prior training data exists, these parameters are pre-loaded; otherwise, they are set to uniform or heuristic values. The initialization also sets up DTW configuration parameters, including cost matrices, alignment constraints, and window sizes. A test is made at block 612 to determine whether there are pre-stored model parameters for a particular vehicle Year, Make, Model and Engine (YMME). If not, standard parameter values are loaded at block 616. If so, stored parameters are loaded at block 620.

Once a parameter set is established, it is loaded at block 620. When training is required, the system executes the Baum-Welch algorithm at block 624 to iteratively adjust the model parameters. This loop alternates between estimating the probability of state sequences using the Forward-Backward algorithm and updating the transition and emission probabilities based on these estimates. The loop continues until convergence is reached, meaning parameter changes fall below a predefined threshold or a maximum iteration count is reached. Upon completion, the trained model parameters are stored for reuse.

When a goal includes determining a likelihood that the observed sequence corresponds to a particular hidden state sequence (e.g., "healthy" vs. "fault"), the system applies the Forward-Backward algorithm at block 628. This computes the forward probabilities (likelihood of the partial observation sequence up to a time t) and backward probabilities (likelihood of the remaining sequence from t+1 to the end) for each state, producing smoothed probabilities for every point in time.

To find a single most probable sequence of hidden states given the observed data, the Viterbi algorithm is applied at block 632. This dynamic programming method recursively computes the highest probability path up to each time step, storing both the probabilities and backpointers to reconstruct the optimal state sequence. The resulting state path identifies the most likely progression of system conditions or faults over time.

Once the HMM has either been trained or is using pre-existing parameters, the observed time-series data is aligned with reference sequences using DTW at block 636. DTW allows comparison of sequences with differing lengths or time distortions by finding the minimum cumulative cost path through a cost matrix. This step can be used in conjunction with HMM (to verify alignment against probable state sequences) or as an alternative sequence similarity measure when state modeling is unnecessary.

A choice as to whether DEW, HMM or both is to be used is made at block 640. If both HMM and DTW are used, the DTW cost score and the HMM sequence probability are combined into a composite metric at block 844. This composite can be weighted based on empirical data, where the HMM probability emphasizes sequence plausibility and DTW emphasizes temporal similarity. If only DTW (block 648) or only HMM (block 652) is used, the composite metric defaults to that method's output.

A HMM can be used without DTW for analysis, as the two methods serve different purposes. HMM is a statistical modeling technique that represents systems with hidden states and observable outputs. It is particularly effective for modeling sequential data where the relationship between the observed signals and the underlying states is probabilistic. In this context, the HMM can learn and represent the temporal patterns and probabilistic transitions between states directly from the sequence of data without relying on any alignment process.

While DTW is often used to align sequences that may vary in speed or length before further analysis, it is not strictly necessary when using an HMM. This is because an HMM inherently accounts for variations in sequence length and timing through its state transition probabilities and observation likelihoods. Therefore, in some applications, the HMM can process the raw sequence data directly, learning the statistical properties and temporal structure of the data without any explicit pre-alignment.

This capability allows HMM-based analysis to be applied in scenarios where alignment is either not required or could introduce distortions. It also simplifies the analysis pipeline by eliminating an additional preprocessing step, which can be beneficial in real-time or computationally constrained environments. However, in certain cases where timing variations are significant and could impact state identification, DTW can still be used as a preprocessing step before HMM analysis to improve robustness.

If an adaptive scenario is determined to be present at block 656, the system re-enters the Baum-Welch training loop at block 624 when new labeled data is available, refining model parameters over time. This loop ensures that the diagnostic performance improves as more real-world sequences are collected. The refinement loop may be triggered manually, scheduled at intervals, or initiated when model accuracy drops below a set threshold.

Next, using the composite metric (or the primary metric if only one method is used), the system determines at block 660 whether the tested sequence falls within acceptable ranges at block 660. Thresholds for pass/fail or category classification (e.g., normal, marginal, fault) are applied. The decision process may also branch into multiple classes if the model supports multi-condition detection. If the sequence is in range, a pass result is stored and the system ends at block 668. If not, a fail result is stored before ending. The system suitably formats the results into a structured diagnostic report. This includes detected states over time, probability scores, DTW alignment results, and any identified deviations from reference patterns. If faults are detected, the report can include probable causes and severity estimates. The results and associated raw/aligned data are suitably stored in a database for historical tracking and further analysis. This allows future model refinement, audit trails, and correlation with repair outcomes.

The following example shows processes used in the forward-backward algorithm and the Baum-Welch training algorithm applied to detect mechanical problems in a vehicle using data from microphones placed inside the engine compartment.

1. Observation of Real-World Signals

Microphones mounted in the engine compartment pick up continuous audio signals. These signals are digitized into a series of short time frames, each containing a snapshot of the engine's acoustic signature. Each time frame is an observation, denoted as $O_1$, $O_2$, $O_3$, etc. In this case, $O_1$ suitably represents a normal combustion sound, $O_2$ captures a faint misfire click, and $O_3$ captures a belt squeal. A goal is to determine a most likely sequence of hidden engine states that produced these sounds.

2. Forward Probabilities

The forward probability, $\alpha\_t(i)$, represents the probability of being in hidden state i at time t, having observed the first t acoustic frames. The forward probability is given by:

$$\alpha_t(i)[\Sigma\alpha_{t-1}(j) \times a_{ji}] \times b_i(O_t)$$

Here, $a_{ji}$ is the probability of transitioning from hidden state j to hidden state i, and $b_i(O_t)$ is the likelihood of observing the current sound frame $O_t$ in state i. For example, if the system was in a 'healthy combustion' state at t−1, and now detects a sound matching a 'slight knock', this equation estimates how likely that change of state is.

3. Backward Probabilities

Backward probability, $\beta\_t(i)$, represents the probability of observing the remaining sound frames from time t+1 to the end, given that the system is currently in hidden state i at time t:

$$\beta_t(i) = \Sigma a_{ij} \times b_j(O_{t+1}) \times \beta_{t+1}(j)$$

This works backward from the end of the observation sequence to see how well future sounds match a hypothesis of being in a particular engine state at time t.

4. Combining Forward and Backward Probabilities

The combined forward-backward result, $\gamma\_t(i)$, gives the probability of being in hidden state i at time t given the entire sequence of observed sounds:

$$\gamma_t(i) = [\alpha_t(i) \times \beta_t(i)] / \Sigma[\alpha_t(k) \times \beta_t(k)]$$

This step blends both the past (forward) and future (backward) information to produce a best estimate of the engine's hidden state at any given time.

5. Baum-Welch Parameter Re-Estimation

The Baum-Welch algorithm refines the model's parameters (transition probabilities and observation likelihoods) so that the system gets better at interpreting the microphone signals over time. It does this by calculating $\xi\_t(i, j)$, the probability of being in state i at time t and transitioning to state j at time t+1:

$$\xi_t(i,j) = [\alpha_t(i) \times a_{ij} \times b_j(O_{t+1}) \times \beta_{t+1}(j)] / \Sigma\Sigma[\alpha_t(p) \times a_{p\_q} \times b\_q (O_{t+1}) \times \beta_{t+1}(q)]$$

These values are used to update $a_{ij}$ and $b_i(O_t)$ iteratively, meaning the system learns from more and more examples of the engine's sound, improving its ability to spot anomalies like knocks, misfires, or belt noises.

6. Real-World Interpretation

In a real-world application, these calculations might reveal that an intermittent knocking sound most often follows a period of normal operation and precedes a misfire event. This statistical linkage lets the diagnostic system flag an early warning, alerting a mechanic before the problem worsens.

The diagnostic features described herein may be implemented into various other diagnostic systems or combined with other diagnostic functionalities. For instance, the diagnostic features described herein may be combined with artificial intelligence interface capabilities as described in U.S. Pat. No. 12,165,440 entitled Vehicle Diagnostics With Intelligent Communication Interface, the contents of which are expressly incorporated herein by reference. It is also contemplated that the features described herein may be combined with known diagnostic processing and repair parts identification capabilities, such as those described in U.S. Pat. No. 9,646,432 entitled Hand Held Data Retrieval Device with Fixed Solution Capability, the contents of which are expressly incorporated herein by reference. Another feature which may be combined with the present disclosure is indicating diagnostic urgency, such as that described in U.S. Pat. No. 9,761,062 entitled Method and Apparatus For Indicating An Automotive Diagnostic Urgency, the contents of which are expressly incorporated herein by reference.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A diagnostic system for diagnosing engine wear using data derived from at least one sensor in a vehicle engine compartment and electronic data from a vehicle communications network to provide a comprehensive vehicle diagnostic assessment, the device being adapted for use in a cloud-based server environment, the diagnostic system comprising:

a sensor device having:
    an audio sensor configured to capture sound data corresponding to engine sound when the sensor device is disposed in the vehicle engine compartment;
    an accelerometer configured to output vibration data corresponding to engine operation when the sensor device is disposed in the vehicle engine compartment; and
    a near-field communication (NFC) tag associated with sensor device information;
    the sensor device configured to facilitate communication of the sensor device information to a remote device to enable identification of optimal sensor device placement within the engine compartment based on the sensor device information;
    the sensor device configured to facilitate communication of the sound data, and the vibration data to a remote server; and
  a data acquisition and transfer (DAT) device connectable with a diagnostic port on the vehicle for receiving vehicle data including event-driven or asynchronous engine performance metrics from an electronic communication network on the vehicle, the DAT configured to facilitate communication of the vehicle data to the remote server to perform diagnostics, wherein a Dynamic Time Warping (DTW) algorithm is applied to align time-series data from one or both the sound data and the vibration data, and the event-driven or asynchronous engine performance metrics prior to identifying engine problems.

2. The system recited in claim 1, wherein the remote device is a smartphone.

3. The system recited in claim 1, wherein the sensor device information is geo-location information of the sensor device.

4. The system recited in claim 1, wherein the sensor device information is positional information of the sensor device relative to a reference point.

5. The system recited in claim 4, wherein the reference point is a secondary sensor device.

6. The system recited in claim 5, wherein the reference point is a location in the vehicle engine compartment.

7. The sensor device recited in claim 1, further comprising a wireless transceiver configured to implement wireless communications via Wi-Fi communication to enable high-speed data transfer and mitigate communication interference by metal-rich vehicle components.

8. The sensor device recited in claim 1, wherein the event-driven or asynchronous engine performance metrics are associated with scan modes comprising a rapid scan mode, an intermediate scan mode and an enhanced scan mode, each scan mode corresponding to different levels of data sampling frequency and diagnostic detail.

9. A diagnostic system for diagnosing engine wear using data derived from at least one sensor in a vehicle engine compartment and electronic data from a vehicle communications network to provide a comprehensive vehicle diagnostic assessment, the device being adapted for use in a cloud-based server environment, the diagnostic system comprising:

a sensor device having:
    at least one sensor configured to output vehicle operation data corresponding to vehicle operational conditions when the sensor device is disposed in the vehicle engine compartment; and
    a near-field communication (NFC) tag associated with sensor device information;
    the sensor device configured to facilitate communication of the sensor device information to a remote device to enable identification of optimal sensor device placement within the engine compartment based on the sensor device information;
    the sensor device configured to facilitate communication of the vehicle operation data to a remote server; and
  a data acquisition and transfer (DAT) device connectable with a diagnostic port on the vehicle for receiving vehicle data including event-driven or asynchronous engine performance metrics from an electronic communication network on the vehicle, the DAT configured to facilitate communication of the vehicle data to the remote server to perform diagnostics, wherein a Dynamic Time Warping (DTW) algorithm is applied to align time-series data from the vehicle operation data, and the event-driven or asynchronous engine performance metrics prior to identifying engine problems.

10. The system recited in claim 9, wherein the remote device is a smartphone.

11. The system recited in claim 9, wherein the sensor device information is geo-location information of the sensor device.

12. The system recited in claim 9, wherein the sensor device information is positional information of the sensor device relative to a reference point.

13. The system recited in claim 12, wherein the reference point is a secondary sensor device.

14. The system recited in claim 13, wherein the reference point is a location in the vehicle engine compartment.

15. The system recited in claim 9, further comprising a wireless transceiver configured to implement wireless communications via Wi-Fi 6 communication protocol to enable high-speed data transfer and mitigate communication interference by metal-rich vehicle components.

16. The system recited in claim 9, wherein the event-driven or asynchronous engine performance metrics are associated with scan modes comprising Quick Scan, Normal Scan, and Deep Scan, each scan mode corresponding to different levels of data sampling frequency and diagnostic detail.

17. A diagnostic system for diagnosing engine wear using data derived from at least one sensor in a vehicle engine compartment and electronic data from a vehicle communications network to provide a comprehensive vehicle diagnostic assessment, the device being adapted for use in a cloud-based server environment, the diagnostic system comprising:

a sensor device having:

at least one sensor configured to output vehicle operation data corresponding to vehicle operational conditions when the sensor device is disposed in the vehicle engine compartment; and a near-field communication (NFC) tag associated with sensor device information;

the sensor device configured to facilitate communication of the sensor device information to a remote device to enable identification of optimal sensor device placement within the engine compartment based on the sensor device information;

the sensor device configured to facilitate communication of the vehicle operation data to a remote server; and a data acquisition and transfer (DAT) device connectable with a diagnostic port on the vehicle for receiving vehicle data including event-driven or asynchronous engine performance metrics from an electronic communication network on the vehicle, the DAT configured to facilitate communication of the vehicle data to the remote server to perform AI-based diagnostics to identify engine wear patterns, wherein a Hidden Markov Model (HMM) is applied to the vehicle operation data, and the event-driven or asynchronous engine performance metrics to analyze temporal sequences for purposes of identifying the engine wear patterns.

18. A diagnostic server system for diagnosing engine wear based on vehicle engine operation, the diagnostic server system comprising:

a communication circuit configured to receive:

a vehicle identification number (VIN) of a vehicle;

sensor position data associated with a vehicle operation sensor for placement in the engine compartment of the vehicle;

time series data corresponding to engine operation captured by the identified vehicle operation sensor, and event-driven or asynchronous engine performance metrics from an OBD-II port of the vehicle;

a memory storing:

engine compartment layout image data associated with the VIN of the vehicle; and placement data corresponding to one or more optimized placement positions of vehicle operation sensor relative to the engine compartment layout image data;

a processor in communication with the communication circuit and the memory, the processor being configured to:

communicate the engine compartment layout image data and the placement data to an associated user device for display;

apply a Dynamic Time Warping (DTW) algorithm to align the time series data with the event-driven or asynchronous engine performance metrics and identify engine wear conditions based on the aligned data.

19. The diagnostic server system of claim 18 wherein the processor is further configured to generate augmented reality or virtual reality overlays of an engine compartment layout image on the associated user device, the overlays including visual indications of the optimized placement positions of the vehicle operation sensor.

20. The diagnostic server system of claim 19 wherein the augmented reality or virtual reality overlays render engine compartment components as interactive objects that the user can virtually move, rotate, or remove to reveal underlying optimized placement positions for the vehicle operation sensor.

21. The diagnostic server system of claim 18 wherein the communication circuit is further configured to receive diagnostic measurement data including thermal, acoustic, or vibration maps from one or more sensors, and wherein the processor is further configured to overlay the received diagnostic measurement data onto the engine compartment layout image or a CAD-derived model, the overlays being communicable to the associated user device to assist in identifying optimized sensor placement and diagnosing engine wear conditions.

* * * * *